(12) United States Patent
Oota

(10) Patent No.: US 6,192,047 B1
(45) Date of Patent: Feb. 20, 2001

(54) TIME DIVISION MULTIPLE EQUIPMENT

(75) Inventor: Sachinori Oota, Koriyama (JP)

(73) Assignee: Hitachi Telecom Technologies, Ltd., Koriyama (JP)

( * ) Notice: Under 35 U.S.C. 154(b), the term of this patent shall be extended for 0 days.

(21) Appl. No.: 09/032,912

(22) Filed: Mar. 2, 1998

(30) Foreign Application Priority Data

Mar. 4, 1997 (JP) .................................................. 9-63980

(51) Int. Cl.[7] .......................... H04L 12/50; H04Q 11/00; H04J 3/04

(52) U.S. Cl. ............................................. 370/375; 370/535

(58) Field of Search .................................. 370/537, 535, 370/538, 539, 470, 471, 464, 375, 376, 357, 360, 498

(56) References Cited

U.S. PATENT DOCUMENTS

| 4,740,959 | * | 4/1988 | Kosugi et al. | 370/95 |
|---|---|---|---|---|
| 4,916,693 | * | 4/1990 | Shimada et al. | 370/84 |
| 5,345,442 | * | 9/1994 | Sato | 370/58.3 |
| 5,410,542 | * | 4/1995 | Gerbehy et al. | 370/85.1 |
| 5,521,920 | * | 5/1996 | Nagase | 370/68 |

* cited by examiner

*Primary Examiner*—Alpus H. Hsu
*Assistant Examiner*—Duc Ho
(74) *Attorney, Agent, or Firm*—Foley & Lardner

(57) ABSTRACT

In a terminal interface, signal data of a terminal is carried on a multi-frame having a period of one per an integral number of the frame period of a digital channel. The terminal interface is connected to a multiple portion through a time division switch. The multiple portion picks up the signal data in the multi-frame with a bit unit and multiplexes them, and a transmission route interface transmits the multiplexed signal data along a high-speed digital line.

12 Claims, 18 Drawing Sheets

FIG.9

2.4 Kbps SIGNAL

| FRAME \ BIT | B7 | B6 | B5 | B4 | B3 | B2 | B1 | B0 |
|---|---|---|---|---|---|---|---|---|
| F1 | 0 | $S_1$ | $D_1$ | $D_2$ | $D_3$ | 1 | 1 | 1 |
| F2 | 1 | 1 | 1 | 1 | 1 | 1 | 1 | 1 |
| F3 | 1 | 1 | 1 | 1 | 1 | 1 | 1 | 1 |
| F4 | 1 | 1 | 1 | 1 | 1 | 1 | 1 | 1 |
| F5 | 1 | 1 | 1 | 1 | 1 | 1 | 1 | 1 |
| F6 | 1 | 1 | 1 | 1 | 1 | 1 | 1 | 1 |
| F7 | 1 | 1 | 1 | 1 | 1 | 1 | 1 | 1 |
| F8 | 1 | 1 | 1 | 1 | 1 | 1 | 1 | 1 |
| F9 | 1 | 1 | 1 | 1 | 1 | 1 | 1 | 1 |
| F10 | 1 | 1 | 1 | 1 | 1 | 1 | 1 | 1 |

9.6 Kbps SIGNAL

| FRAME \ BIT | B7 | B6 | B5 | B4 | B3 | B2 | B1 | B0 |
|---|---|---|---|---|---|---|---|---|
| F1 | 0 | $S_1$ | $D_1$ | $D_2$ | $D_3$ | 1 | 1 | 1 |
| F2 | 1 | 1 | 1 | 1 | 1 | 1 | 1 | 1 |
| F3 | 0 | $S_2$ | $D_4$ | $D_5$ | $D_6$ | 1 | 1 | 1 |
| F4 | 1 | 1 | 1 | 1 | 1 | 1 | 1 | 1 |
| F5 | 1 | 1 | 1 | 1 | 1 | 1 | 1 | 1 |
| F6 | 0 | $S_3$ | $D_7$ | $D_8$ | $D_9$ | 1 | 1 | 1 |
| F7 | 1 | 1 | 1 | 1 | 1 | 1 | 1 | 1 |
| F8 | 0 | $S_4$ | $D_{10}$ | $D_{11}$ | $D_{12}$ | 1 | 1 | 1 |
| F9 | 1 | 1 | 1 | 1 | 1 | 1 | 1 | 1 |
| F10 | 1 | 1 | 1 | 1 | 1 | 1 | 1 | 1 |

38.4 Kbps SIGNAL

| FRAME \ BIT | B7 | B6 | B5 | B4 | B3 | B2 | B1 | B0 |
|---|---|---|---|---|---|---|---|---|
| F1 | 0 | $S_1$ | $D_1$ | $D_2$ | $D_3$ | $D_4$ | $D_5$ | $D_6$ |
| F2 | 0 | $S_2$ | $D_7$ | $D_8$ | $D_9$ | $D_{10}$ | $D_{11}$ | $D_{12}$ |
| F3 | 0 | $S_3$ | $D_{13}$ | $D_{14}$ | $D_{15}$ | $D_{16}$ | $D_{17}$ | $D_{18}$ |
| F4 | 0 | $S_4$ | $D_{19}$ | $D_{20}$ | $D_{21}$ | $D_{22}$ | $D_{23}$ | $D_{24}$ |
| F5 | 1 | 1 | 1 | 1 | 1 | 1 | 1 | 1 |
| F6 | 0 | $S_5$ | $D_{25}$ | $D_{26}$ | $D_{27}$ | $D_{28}$ | $D_{29}$ | $D_{30}$ |
| F7 | 0 | $S_6$ | $D_{31}$ | $D_{32}$ | $D_{33}$ | $D_{34}$ | $D_{35}$ | $D_{36}$ |
| F8 | 0 | $S_7$ | $D_{37}$ | $D_{38}$ | $D_{39}$ | $D_{40}$ | $D_{41}$ | $D_{42}$ |
| F9 | 0 | $S_8$ | $D_{43}$ | $D_{44}$ | $D_{45}$ | $D_{46}$ | $D_{47}$ | $D_{48}$ |
| F10 | 1 | 1 | 1 | 1 | 1 | 1 | 1 | 1 |

FIG.10

8Kbps SIGNAL

| FRAME\BIT | B7 | B6 | B5 | B4 | B3 | B2 | B1 | B0 |
|---|---|---|---|---|---|---|---|---|
| F1 | $S_1$ | $D_1$ | 1 | 1 | 1 | 1 | 1 | 1 |
| F2 | $S_2$ | $D_2$ | 1 | 1 | 1 | 1 | 1 | 1 |
| F3 | $S_3$ | $D_3$ | 1 | 1 | 1 | 1 | 1 | 1 |
| F4 | $S_4$ | $D_4$ | 1 | 1 | 1 | 1 | 1 | 1 |
| F5 | $S_5$ | $D_5$ | 1 | 1 | 1 | 1 | 1 | 1 |
| F6 | $S_6$ | $D_6$ | 1 | 1 | 1 | 1 | 1 | 1 |
| F7 | $S_7$ | $D_7$ | 1 | 1 | 1 | 1 | 1 | 1 |
| F8 | $S_8$ | $D_8$ | 1 | 1 | 1 | 1 | 1 | 1 |
| F9 | $S_9$ | $D_9$ | 1 | 1 | 1 | 1 | 1 | 1 |
| F10 | $S_{10}$ | $D_{10}$ | 1 | 1 | 1 | 1 | 1 | 1 |

56Kbps SIGNAL

| FRAME\BIT | B7 | B6 | B5 | B4 | B3 | B2 | B1 | B0 |
|---|---|---|---|---|---|---|---|---|
| F1 | $S_1$ | $D_1$ | $D_2$ | $D_3$ | $D_4$ | $D_5$ | $D_6$ | $D_7$ |
| F2 | $S_2$ | $D_8$ | $D_9$ | $D_{10}$ | $D_{11}$ | $D_{12}$ | $D_{13}$ | $D_{14}$ |
| F3 | $S_3$ | $D_{15}$ | $D_{16}$ | $D_{17}$ | $D_{18}$ | $D_{19}$ | $D_{20}$ | $D_{21}$ |
| F4 | $S_4$ | $D_{22}$ | $D_{23}$ | $D_{24}$ | $D_{25}$ | $D_{26}$ | $D_{27}$ | $D_{28}$ |
| F5 | $S_5$ | $D_{29}$ | $D_{30}$ | $D_{31}$ | $D_{32}$ | $D_{33}$ | $D_{34}$ | $D_{35}$ |
| F6 | $S_6$ | $D_{36}$ | $D_{37}$ | $D_{38}$ | $D_{39}$ | $D_{40}$ | $D_{41}$ | $D_{42}$ |
| F7 | $S_7$ | $D_{43}$ | $D_{44}$ | $D_{45}$ | $D_{46}$ | $D_{47}$ | $D_{48}$ | $D_{49}$ |
| F8 | $S_8$ | $D_{50}$ | $D_{51}$ | $D_{52}$ | $D_{53}$ | $D_{54}$ | $D_{55}$ | $D_{56}$ |
| F9 | $S_9$ | $D_{57}$ | $D_{58}$ | $D_{59}$ | $D_{60}$ | $D_{61}$ | $D_{62}$ | $D_{63}$ |
| F10 | $S_{10}$ | $D_{64}$ | $D_{65}$ | $D_{66}$ | $D_{67}$ | $D_{68}$ | $D_{69}$ | $D_{70}$ |

64Kbps SIGNAL

| FRAME\BIT | B7 | B6 | B5 | B4 | B3 | B2 | B1 | B0 |
|---|---|---|---|---|---|---|---|---|
| F1 | $D_1$ | $D_2$ | $D_3$ | $D_4$ | $D_5$ | $D_6$ | $D_7$ | $D_8$ |
| F2 | $D_9$ | $D_{10}$ | $D_{11}$ | $D_{12}$ | $D_{13}$ | $D_{14}$ | $D_{15}$ | $D_{16}$ |
| F3 | $D_{17}$ | $D_{18}$ | $D_{19}$ | $D_{20}$ | $D_{21}$ | $D_{22}$ | $D_{23}$ | $D_{24}$ |
| F4 | $D_{25}$ | $D_{26}$ | $D_{27}$ | $D_{28}$ | $D_{29}$ | $D_{30}$ | $D_{31}$ | $D_{32}$ |
| F5 | $D_{33}$ | $D_{34}$ | $D_{35}$ | $D_{36}$ | $D_{37}$ | $D_{38}$ | $D_{39}$ | $D_{40}$ |
| F6 | $D_{41}$ | $D_{42}$ | $D_{43}$ | $D_{44}$ | $D_{45}$ | $D_{46}$ | $D_{47}$ | $D_{48}$ |
| F7 | $D_{49}$ | $D_{50}$ | $D_{51}$ | $D_{52}$ | $D_{53}$ | $D_{54}$ | $D_{55}$ | $D_{56}$ |
| F8 | $D_{57}$ | $D_{58}$ | $D_{59}$ | $D_{60}$ | $D_{61}$ | $D_{62}$ | $D_{63}$ | $D_{64}$ |
| F9 | $D_{65}$ | $D_{66}$ | $D_{67}$ | $D_{68}$ | $D_{69}$ | $D_{70}$ | $D_{71}$ | $D_{72}$ |
| F10 | $D_{73}$ | $D_{74}$ | $D_{75}$ | $D_{76}$ | $D_{77}$ | $D_{78}$ | $D_{79}$ | $D_{80}$ |

FIG.11

| SERIES OF COMMUNICATION SPEED | TRANSMISSION SPEED | THE NUMBER OF DATA BITS PER THE 0.8kHz MULTI-FRAME | TRANSFERRING WAY | |
|---|---|---|---|---|
| | | | THE NUMBER OF TRANSFERRING BITS PER THE 8kHz FRAME | THE NUMBER OF TRANSFERRING FRAME PER THE 8kHz MULTI-FRAME |
| 1.2Kbps SERIES | 1.2 | 1.5 (×2) | 3 | 0.5 (×2) |
| | 2.4 | 3 | 3 | 1 |
| | 4.8 | 6 | 3 | 2 |
| | 7.2 | 9 | 3 | 3 |
| | 9.6 | 12 | 3 | 4 |
| | 14.4 | 18 | 3 | 6 |
| | 19.2 | 24 | 3 | 8 |
| | 38.4 | 48 | 6 | 8 |
| 8Kbps SERIES | 8 | 10 | 1 | 10 |
| | 16 | 20 | 2 | 10 |
| | 24 | 30 | 3 | 10 |
| | 32 | 40 | 4 | 10 |
| | 48 | 60 | 6 | 10 |
| | 56 | 70 | 7 | 10 |
| | 64 | 80 | 8 | 10 |

FIG.14

(1) INITIAL SYNCHRONOUS ESTABLISHMENT PATTERN (7 BITS PATTERN)

|    | 1 | 2 | 3 | 4 | 5 | - - - - - | RK |
|----|---|---|---|---|---|-----------|----|
| H1 | 1 |   |   |   |   |           |    |
| 2  | 1 |   |   |   |   |           |    |
| 3  | 0 |   |   |   |   |           |    |
| 4  | 0 |   |   |   |   |           |    |
| 5  | 0 |   |   |   |   |           |    |
| 6  | 1 |   |   |   |   |           |    |
| 7  | 0 |   |   |   |   |           |    |
| 8  | A |   |   |   |   |           |    |
| 9  |   |   |   |   |   |           |    |
| H10|   |   |   |   |   |           |    |

A=0: NO SYNCHRONOUS ESTABLISHMENT

A=1: SYNCHRONOUS ESTABLISHMENT (2) SHRINK SYNCHRONOUS PATTERN (3 BITS PATTERN)

|    | 1 | 2 | 3 | 4 | 5 | - - - - - | RK |
|----|---|---|---|---|---|-----------|----|
| H1 | 1 |   |   |   |   |           |    |
| 2  | 1 |   |   |   |   |           |    |
| 3  | 0 |   |   |   |   |           |    |
| 4  |   |   |   |   |   |           |    |
| 5  |   |   |   |   |   |           |    |
| 6  |   |   |   |   |   |           |    |
| 7  |   |   |   |   |   |           |    |
| 8  |   |   |   |   |   |           |    |
| 9  |   |   |   |   |   |           |    |
| H10|   |   |   |   |   |           |    |

TIME DIVISION MULTIPLE EQUIPMENT

BACKGROUND OF THE INVENTION

This invention relates to a time division multiple equipment for multiplexing, in the time division type, digital data from a plurality of a data terminal equipment having various data transmission speeds and effectively transmitting through a high-speed digital line.

FIG. 18 shows one example of the conventional time division multiple equipment. According to the structure of the equipment, various terminal interfaces DATA I/F, a high-speed digital interface SDI I/F, and a controller CONT are connected in a bus system by means of a highway HW.

Low-speed data of the terminal interface DATA I/F is transmitted one bit by one bit to the high-speed digital interface SDI I/F according to instructions of the controller CONT, so that a bit multiplexing process is carried out.

One example of this system is described in Japanese Patent Laid-open 61 (1986)-163741 official gazette. This system has a simple structure, so it has been employed in many time division multiple equipment of relatively small size.

FIG. 19 is a figure obtained from "High Function MTDM System Structure", page 1435 to 1453 of NTT Study Practicalization Report, Volume 36, No 11 (1987).

This example above has a time division switch TSW exchanging in the time division type at a basic speed of 64 Kbits per 1 sec (hereinafter, it is expressed by Kbps). The time division switch divides the signal speed from the terminal interface DATA I/F into 3.2 Kbps series and 8 Kbps series. A bit multiplexing process of 3.2 Kbps, 8 Kbps, 0.4 Kbps is carried out by means of a time slot exchanger TSI.

Also, the output sides of the time division switch TSW and each time slot exchanger TSI are connected to the input sides of other time slot exchanger TSI or the time division switch TSW. It is called a crossing form of connection, so that the same data traffic passes several times the same time slot exchanger TSI and the time division switch TSW. Consequently, the traffic of the time slot exchanger TSI, in particular the time division switch TSW becomes very large one.

Detail of the equipment of the example is reported in NTT Study Practicalization Report, volume 36, No 11(1987), "High Function MTDM System Structure".

A time division switch of multi-dimension speed data is disclosed in Japanese Patent Laid-open 61 (1986)-242193 official gazette and Japanese Patent laid-open 62 (1987)-57398 official gazette.

According to the conventional system mentioned above having no time division switch, its structure is simple. However, it is difficult to be corresponded to a change of the line structure due to a traffic change and to enlarge its scale. They are disadvantages.

According to the conventional system having the time division switch, it is necessary to install the time slot exchanger TSI for carrying out the bit-multiplexing process every signal speed series of the data terminal equipment. Therefore, considering the change of the traffic among each signal speeds, it is necessary to prepare a hardware corresponding to the largest traffic of each signal speed, and it is not easy to correspond economically to the change of data traffic.

According to the system, because the same data traffic passes repeatedly through the time division switch TSW and the time slot exchanger TSI, the hardware of the time slot exchanger TSI, in particular the time division switch TSW, becomes disadvantageously large.

The invention has been invented so as to solve such problems of the above-mentioned conventional system. The purpose of this invention is to provide an economic time division multiple equipment for carrying out unificationally the bit-multiplexing process without any relation to a signal speed of the data terminal equipment. Further, the purpose is to provide the time division switch having a structure preventing the same data traffic from passing repeatedly through the time division switch, and the time division multiple equipment having both expandability and flexibility to the change of the data traffic among these signal speeds.

SUMMARY OF THE INVENTION

This invention solves the problem described above. This invention has a terminal interface, a multiple portion and a transmission route interface. The terminal interface carries a low-speed data from a data terminal equipment upon a multi-frame. This multi-frame has a period of one per an integral number in a frame period of a digital channel set previously at the basic speed. The multiple portion multiplexes a signal bit with a bit unit by picking up only the signal bit of the data signal from the data terminal equipment in a plurality of multi-frame and by mapping the signal bit according to the content stored in a mapping-table. On the multi-frame, the data signal from a plurality of the data terminal equipment is carried from the data terminal equipment. The transmission route interface matches a bit array, multiplexed by the multiple portion, with a transmission speed of the high-speed digital line and transmits the bit array to the high-speed digital line.

According to the invention, the low-speed data signal from a plurality of the data terminal equipment is multiplexed unificationally with a bit unit without any relation of the data transmission speed. Therefore, it becomes possible to carry the data signal from the plurality of the data terminal equipment on the digital channel of the basic speed by means of the same equipment. Consequently, this can improve the efficiency of using the high-speed digital line.

Another aspect of the invention is characterized with the time division multiplex equipment having a terminal interface, a time division switch, a multiple portion and a transmission route interface, wherein the time division switch is provided between the terminal interface and the multiple portion. The terminal interface carries a low-speed data from a data terminal equipment upon a multi-frame. This multi-frame has a period of one per an integral number in a frame period of a digital channel set previously at the basic speed. The time division switch carries out the time division exchanging process at the basic speed. The multiple portion multiplexes a signal bit with a bit unit by picking up only the signal bit of the data signal from the data terminal equipment in a plurality of multi-frame and by mapping the signal bit according to the content stored in a mapping-table. On the multi-frame, the data signal from a plurality of the data terminal equipment is carried from the data terminal equipment. The transmission route interface matches a bit array, multiplexed by the multiple portion, with a transmission speed of the high-speed digital line and transmits the bit array to the high-speed digital line.

According to the invention, the low-speed data signal from the plurality of the data terminal equipment is multiplexed unificationally with a bit unit without any relation of the data transmission speed. Therefore, it becomes possible to carry the data signal from the plurality of the data terminal equipment on the digital channel of the basic speed by means of the same equipment. Consequently, this can improve the efficiency of using the high-speed digital line. Further, the changing of the connection of the time division switch can change the circuit structure on demand.

The invention relates to is the time division multiple equipment, in another aspect of the invention, in which the number of bits with reference to a virtual table mapped by the mapping-table carrying out the bit multiplexing process is equal to a figure obtained by multiplying a bit capacity per one time slot in the one multi-frame by the number of the time slot.

According to this aspect of the invention, because the bit capacity to be mapped and the number of bits with reference to the mapping-table mapped are equal to each other, the mapping operation is made easy.

The invention relates to time division multiple equipment, in yet another aspect of the invention, in which the number of bits with reference to a virtual table to be mapped by the mapping-table carrying out the multiplexing process is less than a figure obtained by multiplying a bit capacity per one time slot of the one multi-frame by the number of the time slot.

According to this other aspect of the invention, the number of bits with reference to the mapping-table to be mapped is lower than the bit capacity to be mapped. Therefore, non-effective bit is removed in a mapping stage and it is possible to band-compress it at the same as the mapping.

The time division multiple equipment of the invention, according to still another aspect of the invention, is characterized in that one length of the virtual table possible to be mapped by the mapping-table for carrying out the bit-multiplexing process is made equal with the number of frames in the one multi-frame.

According to this other aspect of the invention, the number of frames with reference to the bit pattern corresponding to the data to be mapped is equal to one length of the virtual table mapped. Therefore, the mapping work becomes easy, and the multiplexing process and the de-multiplexing process become easy resulting in an economic apparatus of the invention.

The time division multiple equipment in still another aspect of the invention, is characterized in that the plurality of the mapping-table for mapping the signal bit of the data signal from the data terminal equipment and the transmission route are provided, wherein the content of the mapping-table can be flexibly changed according to the changing of the line structure and the exchanging of the mapping-table makes it possible to change the line structure according to the content of the exchanged mapping-tables.

According to this aspect of the invention, when changing the structure of the network, user can select the previously set mapping-table corresponding to the network structure without re-writing the content of the mapping-table corresponding to the network structure at each time of changing the network structure. Therefore, user can change these network structures instantly without necessity of re-writing the contents of the former mapping-table.

The time division multiple equipment according to another aspect of the invention, is characterized in that the input signal entering at random time from the plurality of the transmission route is once memorized every route in a memory while the position of the bit multiplexing synchronous signal every route is at random condition, the input signal is read out of the memory so as to make these synchronous signals of each route equal in phase to each other, and a bit de-multiplexing process is carried out.

According to this other aspect of the invention, the synchronous signal is placed always at a head of the signal bit array every route. Therefore, it is easy to carry out the bit de-multiplexing process. The bit arrangement every route becomes equal to the bit arrangement of the bit multiplexing process. Consequently, it is possible to use the mapping-table for the bit multiplexing process in the bit de-multiplexing process.

BRIEF DESCRIPTION OF THE DRAWINGS

FIG. 9 is an explanation view showing a case in which the 1.2 Kbps series data is ridden on the multi-frames.

FIG. 10 is an explanation view of the case in which the 8 Kbps series data is ridden on the multi-frames.

FIG. 11 is an explanation view of the case using the multi-frames to transmit the data of 1.2 Kbps series and 8 kbps series.

FIG. 14 is an explanation view of the initial synchronous establishment pattern and the shrink synchronous pattern.

DETAILED EXPLANATION

Figure 1:
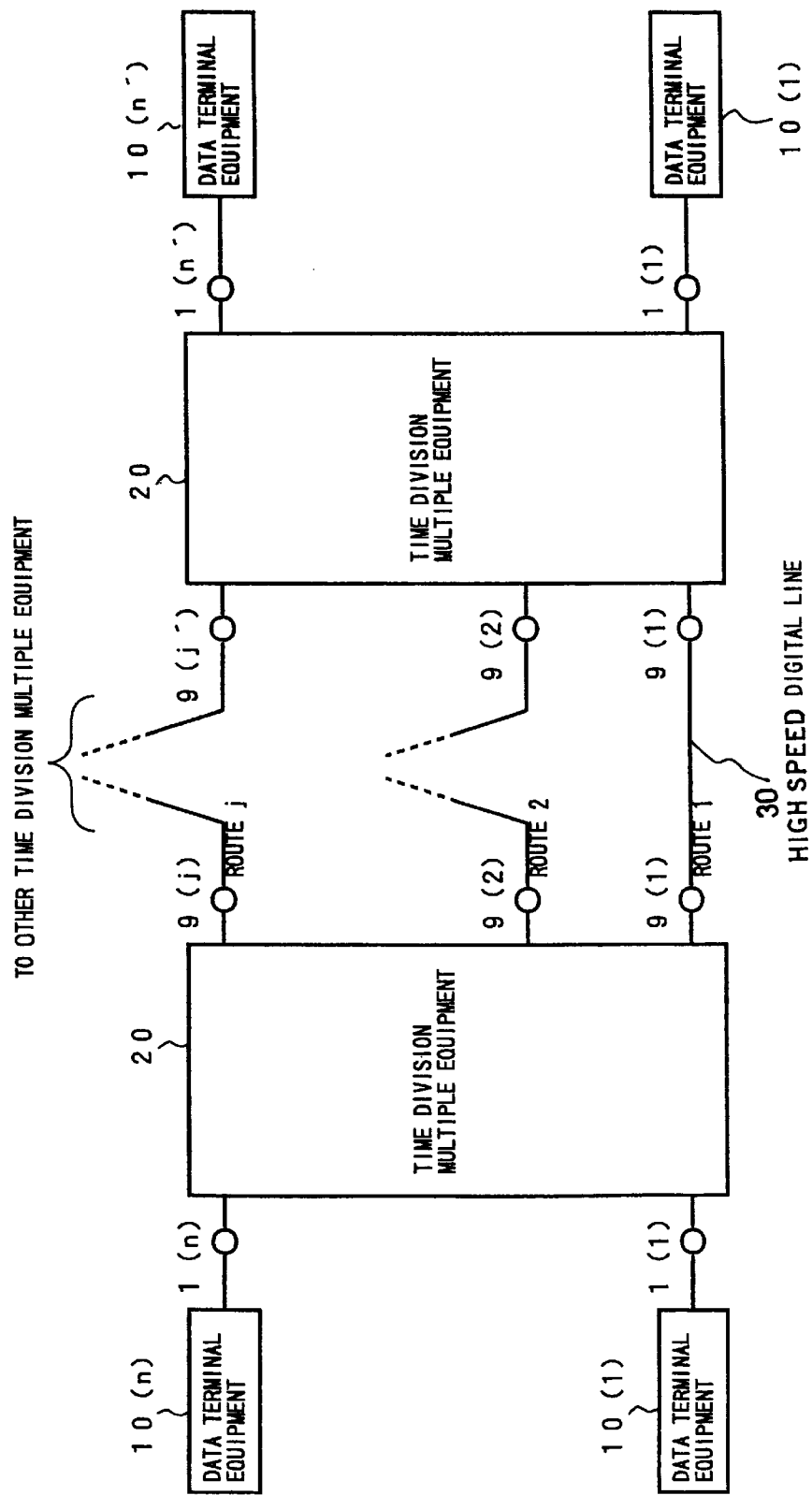
FIG. 1 is a system structural view of the embodiment of the invention.

FIG. 1 is a system structure view showing an embodiment of the invention. This system in FIG. 1 has a data terminal equipment DTE 10, a time division multiple equipment 20 and a high-speed digital line 30.

The DTE 10 has various data transmission speeds and adopting both the synchronous system and the asynchronous system even in one-way synchronous system. The various data transmission speeds is, for example, 1.2 Kbit per second (hereinafter, it is shown by Kbps) series provided with the data transmission speed of positive number times of 1.2 Kbps, or 8 Kbps series provided with the data transmission speed of positive number times of 8 Kbps. The high-speed digital line 30 has a speed of the positive number times of the basic speed of such as 64Kbps in, for example, the integrated service digital network (hereinafter it is ISDN).

The DTE 10 (equipment number is shown in the bracket) is connected to the time division multiple equipment 20 through an input/output port 1 of the time division multiple equipment 20. Further, the time division multiple equipment 20 is connected to the high-speed digital line 30 of each route through an input/output port 9 (line number is shown in the bracket) and also to a time division multiplex equipment 20 of the other office network.

The network according to the embodiment is different from an exchanging network for executing a connection every call and is network to which a plurality of the DTE 10 are semi-permanently connected.

The time division multiple equipment 20 has a main purpose of multiplexing a low-speed data of comparatively low speed of the DTE 10, and transmitting the multiplexed terminal data through the channel of the previously set basic speed, for example, a comparatively large basic speed of 64Kbps.

Figure 2:
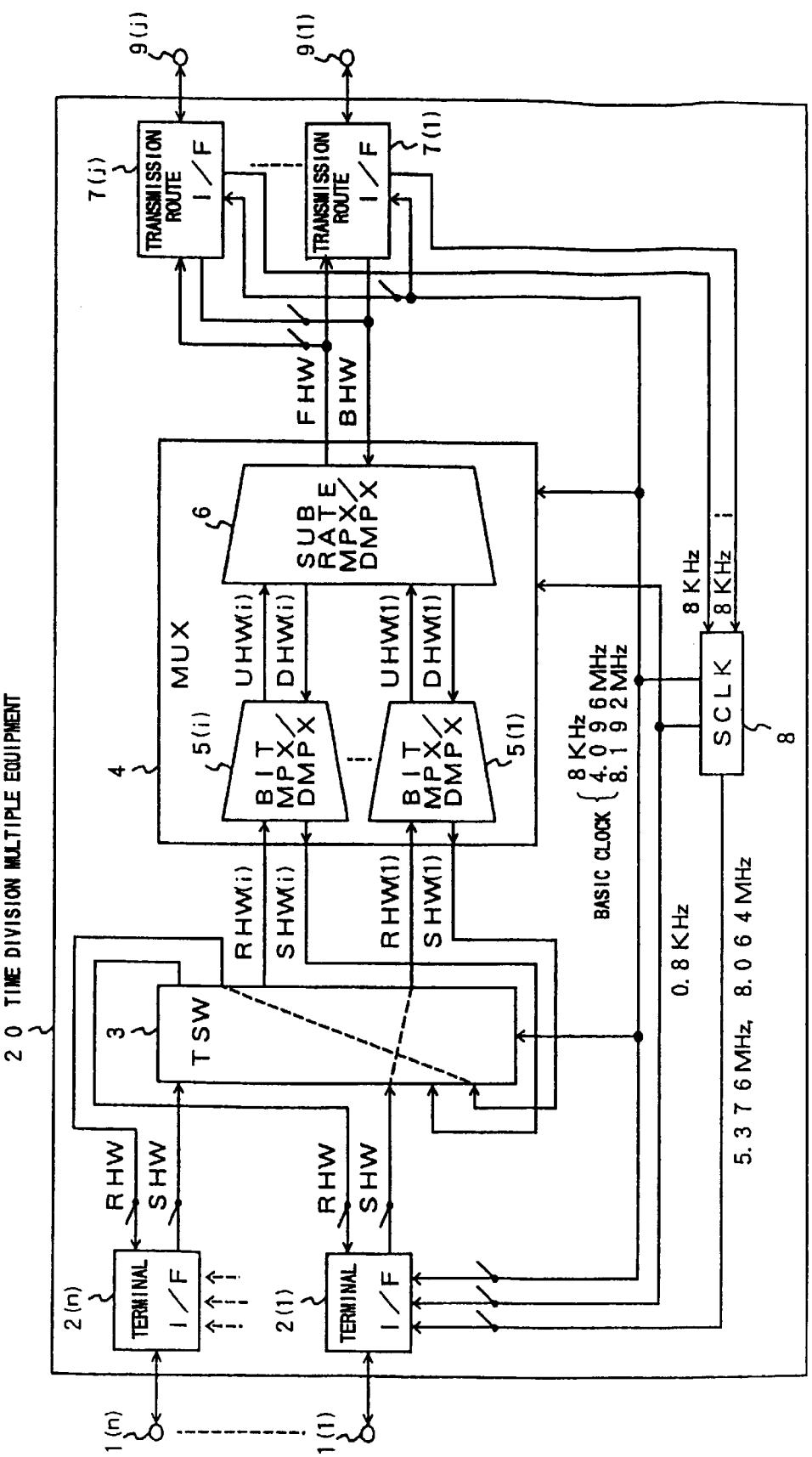
FIG. 2 is a block diagram showing a structure of the time division multiple equipment shown in FIG. 1.

FIG. 2 is a block diagram showing a structure of the time division multiple equipment 20 of an example of the invention. The basic speed of the digital line is able to be previously and freely set. In an explanation of the time division multiple equipment 20, when the basic speed is 64Kbps, ISDN providing the high-speed digital line 30 of the positive number times of the basic speed is used. The high-speed digital line 30 has a standard I-interface of the international electricity communication standard division of the international electricity communication federation (hereinafter, it is called ITU-T) is structured for subscribers.

As shown in FIG. 2, the time division multiple equipment 20 has an input/output port 1 to which the DTE 10 of various kinds are connected and only one group of the terminals is shown. English figures in the bracket after marks show the circuit numbers (No.). That is, according to the embodiment shown in FIG. 2, there are "n" pieces of input/output ports from one (1) to (n). It is possible to respectively connect the input/output port "n" to the data terminal equipment DTE "n". Here, "n" is any integral.

The terminal interface 2 (hereinafter, the interface is shown as I/F) has a function for carrying the data from the DTE 10 on a transmission highway of 64Kbps.

As shown and described before, the data transmission speeds of the DTE 10 has the data transmission speed of 1.2 Kbps series and the data transmission speed of 8 Kbps series. The data transmission speed of the positive number time of 1.2 Kbps, which the 1.2 Kbps series has, is, for example, 2.4 Kbps and 4.8 Kbps. The data transmission speed of the positive number time of 8 Kbps, which the 8 Kbps series has, is, for example, 16 Kbps and 32 Kbps.

Both control systems for these data transmission speeds have difference, so that both systems will be differently explained.

A time division switch TSW 3 carries out the time division exchanging connections in 64Kbps channel unit.

A multiplexing process portion MUX 4 corresponding to the multiple portion is composed with a plurality of the bit multiplexer/de-multiplexer BIT MPX/DMPX 5, and a plurality of the sub-rate multiplexer/de-multiplexer SUBRATE MPX/DMPX 6 for multiplexing a bit data multiplexed by these BIT MPX/DMPX 5.

The BIT MPX/DMPX 5 in a part of the MUX 4 multiplexes the low-speed data of the DTE 10 with a bit unit, wherein the low-speed data is transmitted with the 64Kbps channel from the TSW 3.

The SUBRATE MPX/DMPX 6 in a part of the MUX 4 multiplexes in the time division system the digital signals sent from each BIT MPX/DMPX 5. The SUBRATE MPX/DMPX 6 transmits the digital signal multiplexed by the BIT MPX/DMPX 5 to the forward highway FHW.

A transmission route I/F 7 picks up the data to be transmitted to its own transmission route from the forward highway FHW. The transmission route I/F 7 transmits the picked-up data to the transmission route in accordance with the transmission speed of the high-speed digital line 30.

A system clock generator 8 generates the clock signal synchronized with a synchronous signal sent from the transmission route. The system clock generator 8 generates all clock signals necessary to the time division multiple equipment 20.

Next, the outline of the operation of the time division multiple equipment 20 will be explained with reference to FIG. 2.

The terminal I/F 2 transmits the data from the DTE 10 having various data transmission speed or the DTE 10 for the both of the synchronous system and the asynchronous system, with the 64Kbps channel of a sending highway SHW having a basic unit of 64Kbps channel. The embodiment will be explained with the presumption that the highway speed is a speed of 4.096 megabit per second (hereinafter, it is called 4 Mbps) of 64Kbps channel.

The data mentioned above carried on the 64Kbps channel of the sending highway SHW is connected to one of the receiving highway RHW in the MUX 4 by the operation of the TSW 3. This receiving highway RHW is connected to one of the BIT MPX/DMPX 5 provided in the MUX 4.

English figures in the bracket after the mark "5" corresponding to the BIT MPX/DMPX shows the circuit numbers (No.) and the rule will be applied to the following description. "i=4" will be used hereinafter.

In the receiving highway RHW connected to one of the BIT MPX/DMPX 5, even though the low-speed data of the 1.2 Kbps series is transmitted with the 64Kbps channel, so the efficiency is very low.

Therefore, a multiplexer MPX 5-6 of the BIT MPX/DMPX 5 uses the bit multiplexing process technology which will be explained in order to multiplex only the significant signal data (hereinafter, it is meaningful data) sent from the DTE 10.

As described above, the data that is bit-multiplexed by the MPX 5-6 is transmitted to the upward highway UHW. This data is transmitted to the SUBRATE MPX/DMPX 6 in the MUX 4. At this time, the output data of the other BIT MPX/DMPX 5 is input in the SUBRATE MPX/DMPX 6.

A multiplexer MPX 6-3 of the SUBRATE MPX/DMPX 6 multiplexes the data from four (i=4) upward highway UHW every route of the transmission route to be output and transmits the multiplexed data to the forward highway FWH.

This forward highway FHW is connected with the "j" pieces of the transmission route I/F 7. Here, the transmission route I/F 7 interfaces with, for example, the ISDN digital line end terminal equipment DSU and is connected to the high-speed digital line 30.

Each transmission route I/F 7 takes in only the data allotted to its own line from the forward highway FHW. Further, the transmission route I/F 7 sends this data with a speed appropriate to the data transmission speed of the transmission route to the corresponding output ports 9(1) through 9(j) in accordance with the clock signal from the system clock generator SCLK 8.

While, the transmission route I/F 7 picks up the synchronous signal from the data transmitted from the transmission route to the port 9, and transmits the data with a vacant time slot of the backward highway BHW.

The data of the backward highway BHW is transmitted to the downward highway DHW through the de-multiplexer DMPX portion of the SUBRATE MPX/DMPX 6 in the MUX 4.

When the BIT MPX/DMPX 5 receiving the data from the downward highway DHW, the de-multiplexer DMPX of the BIT MPX/DMPX 5 divides the data on the downward highway DHW into these data of other person every the DTE 10. The DMPX of the BIT MPX/DMPX 5 transmits these data with the 64Kbps to the sending highway SHW by means of a bit mapping-table 5-15, which is not shown in FIG. 2.

The 64Kbps channel multiplexed in the time division on the sending highway SHW is connected to the receiving highway RHW of the terminal I/F 2 corresponding to the DTE 10 of other person by means of the TSW 3. The terminal I/F 2 takes in the data of the 64Kbps channel allotted to itself from the receiving highway RHW. Further, the terminal I/F 2 converts the data transmission speed of the DTE 10. When the DTE 10 being an asynchronous terminal, the terminal I/F 2 carries out the converting of the synchronous/asynchronous and transmits the converted data to the port 1.

Outline of operation of the time division multiple equipment 20 shown in FIG. 2 has been explained. Next, detailed operation of individual parts and principle of multiplication will be explained with reference to FIG. 3.

Figure 3:
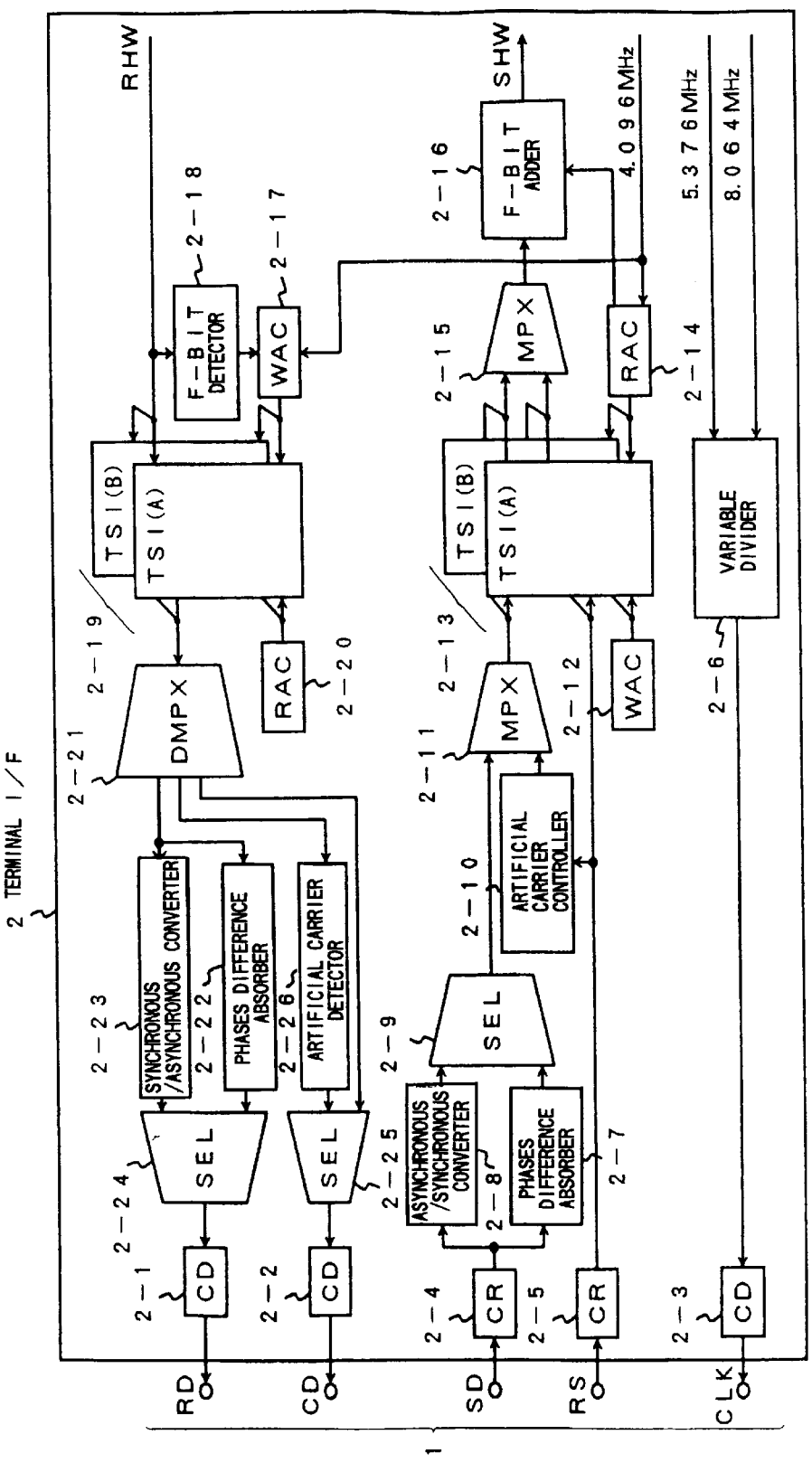
FIG. 3 is a block diagram showing a structure of the terminal interface in FIG. 2.

FIG. 3 is a block diagram showing a structure of the terminal I/F 2 and the DTE 10 is connected with five (5) ports shown in the left side of FIG. 3.

As shown in the left side of FIG. 3, these five ports have cable driver CD 2-1, 2-2, 2-3 and cable receivers CR 2-4, 2-5. These five ports carry out a matching with a logic level in the terminal I/F 2 and the outside cable. When a variable divider 2-6 receives the clock signal from the system clock generator SCLK 8, the variable divider 2-6 divides this clock signal in order to generate a necessary clock in the terminal I/F 2.

Also, this terminal I/F 2 has a phases difference absorber 2-7,2-22, an asynchronous/synchronous converter 2-8, a synchronous/asynchronous converter 2-23 and a selector SEL 2-9, 2-24. The phases difference absorbers 2-7, 2-22 absorb the phase difference between these synchronous signals of the synchronous DTE 10 and the terminal I/F 2.

The asynchronous/synchronous converter 2-8 converts the signal data from the asynchronous DTE 10 into the synchronous signal of the terminal I/F 2. The synchronous/asynchronous converter 2-23 converts the synchronous signal of the terminal I/F 2 into the signal data of the asynchronous DTE 10. The selector 2-9, 2-24 selects one of the synchronous or the asynchronous.

Also, the terminal I/F 2 has an artificial carrier controller 2-10, an artificial carrier detector 2-26, a multiplexer MPX 2-11 and a selector SEL 2-25. The artificial carrier controller 2-10 controls a generation of artificial carrier signals sent before and after a sending of signal data. The artificial carrier detector 2-26 detects the artificial carrier signals in the signal data. The MPX 2-11 multiplexes the signal data and the artificial carrier signal generated from the artificial carrier controller 2-10 so as to carry the artificial carrier signal before and after the data signal. Also, the selector SEL 2-25 selects one of the control signal directly received or the control signal through the artificial carrier detector 2-26.

Further, the terminal I/F 2 has a receiving time slot exchanging portion TSI 2-13, a sending time slot exchanging portion TSI 2-19, a write-in address controller WAC 2-12 and a read-out address controller RAC 2-14, and a write-in address controller WAC 2-17 and a read-out address controller RAC 2-20. The WAC 2-12 controls the write-in of the TSI 2-13 and the RAC 2-14 controls the read-out of the TSI 2-13. The WAC 2-17 controls the write-in of the TSI 2-19 and the RAC 2-20 controls the read-out of the TSI 2-19.

Also, the terminal I/F 2 has a multiplexer MPX 2-15 for multiplexing the data from each DTE 10 and sending the multiplexed data in the sending highway SHW, and a de-multiplexer DMPX 2-21 for dividing signals from the TSI 2-19 at a reception side.

Further, the terminal I/F 2 has two F-bit circuits 2-16, 2-18. The F-bit adder 2-16 adds the F-bit to the data carried on the frame. The F-bit detector 2-18 detects the F-bit included in the data. A detail of F-bit will be explained later.

Next the operation of the terminal I/F 2 will be explained with reference to FIG. 3.

The port data 1 shown in FIG. 1 and FIG. 2 includes a port data, a reception data RD, a carrier detection CD, a sending data SD, a sending request RS and a clock CLK shown in FIG. 3.

When the DTE 10 requests a sending operation, the DTE 10 transmits the sending request RS signal to the terminal I/F 2. When the terminal I/F 2 receiving the sending request RS signal through the cable receiver CR 2-5, the cable receiver CR 2-5 of the terminal I/F 2 converts the sending request RS signal in the logic level. And the cable receiver CR 2-5 transmits the converted sending request RS signal to the artificial carrier controller 2-10 and the TSI (A), (B) 2-13.

Here, there are two ways of transmission of the sending request RS signal. One way is that a scramble signal called the artificial carrier signal is carried on the main signal of such as the advice V13 of ITU-T at the beginning and the end of the communication. Another way is that the sending request RS signal is carried on the signal bit named S-bit which will be explained later.

When the terminal I/F 2 uses the artificial carrier signals, the artificial carrier controller 2-10 (scramble circuit) receives the sending request RS signal and generates the artificial carrier signal according to the sending request RS signal. This artificial carrier controller 2-10 inputs the artificial carrier signal into the TSI (A), (B) 2-13 through the MPX 2-11.

Also, when the terminal I/F 2 uses the S-bit as the signal-bit, the WAC 2-12 writes the sending request RS signal in the S-bit point of the TSI (A), (B) 2-13.

The sending data SD signal from the DTE 10 is transmitted to the sending port SD. The DTE 10 has the synchronous function and the asynchronous function. The terminal I/F 2 transmits the clock signal through the clock port CLK from the cable driver CD 2-3 to the synchronous DTE 10. This synchronous DTE 10 synchronizes with the clock signal and transmits the sending data SD to the terminal I/F 2.

Also, the asynchronous DTE 10 doesn't receive the clock signal from the terminal I/F 2. This asynchronous DTE 10 includes a start-stop transmission terminal equipment and the like for adding a start signal and a stop signal before and after, for example, a series of the data signal and sending the added data signal.

In case of the synchronous DTE 10, the cable receiver CR 2-4 of the terminal I/F 2 converts the sending data signal through the port SD in the logic level. The cable receiver CR 2-4 transmits the converted sending data signal to the phases difference absorber 2-7. The phases difference absorber 2-7 matches these phase between the clock of the sending data and the inner clock. The phases difference absorber 2-7 transmits the matched sending data to the selector SEL 2-9. This selector SEL 2-9 judges on the basis of the matched data whether it is synchronous or asynchronous. The selector SEL 2-9 transmits the judged sending data to the MPX 2-11.

In case of the asynchronous DTE 10, the cable receiver CR 2-4 transmits the asynchronous data signal to the asynchronous/synchronous converter 2-8. The asynchronous/synchronous converter 2-8 converts the asynchronous data signal into the synchronous data signal and transmits the synchronous data signal to the SEL 2-9. This SEL 2-9 judges on the basis of the synchronous data signal whether it is synchronous or asynchronous. The SEL 2-9 transmits the judged data to the MPX 2-11.

The MPX 2-11 multiplexes the data signal from the SEL 2-9 and the artificial carrier signal. The MPX 2-11 transmits the multiplexed data signal to the TSI (A), (B) 2-13. The WAC 2-12 writes sequentially the multiplexed data signal in the TSI (A), (B) 2-13. The RAC 2-14 reads out at random the multiplexed data signal written in the TSI (A), (B) so as to match with the data format on the highway. Further the RAC 2-14 carries the read-out data signal on the appointed time slot.

Also, in the case that the control signal is transmitted by using the S-bit without using the artificial carrier signal, the MPX 2-11 doesn't multiplex the data signal from the SEL 2-9 and the artificial carrier signal. The MPX 2-11 transmits the data signal from the SEL 2-9 and a control signal to the TSI (A), (B) 2-13. The WAC 2-12 writes sequentially the data signal and the control signal in the TSI (A), (B) 2-13. The RAC 2-14 reads out the data signal and the control signal written in the TSI (A), (B) 2-13 at the predetermined time slot. The RAC 2-14 transmits the data signal and the control signal to the MPX 2-15. This MPX 2-15 multiplexes the data signal and the control signal and arranges the multiplexed signal on the same format.

As shown in FIG. 3, the TSI (A), (B) 2-13 have two same faces. They are used alternately in write-in operation and read-out operation every 0.8 KHz and these write-in and read-out can be executed at a same time. Other than the TSI (A), (B) 2-13, these having identifications (A), (B) after these marks are used alternately. When one of them are in write-in operation, it is shown that the other executes the read-out operation.

Now, a carrying of the data on a time slot will be explained with reference to FIG. 7 through FIG. 11.

Figure 7:
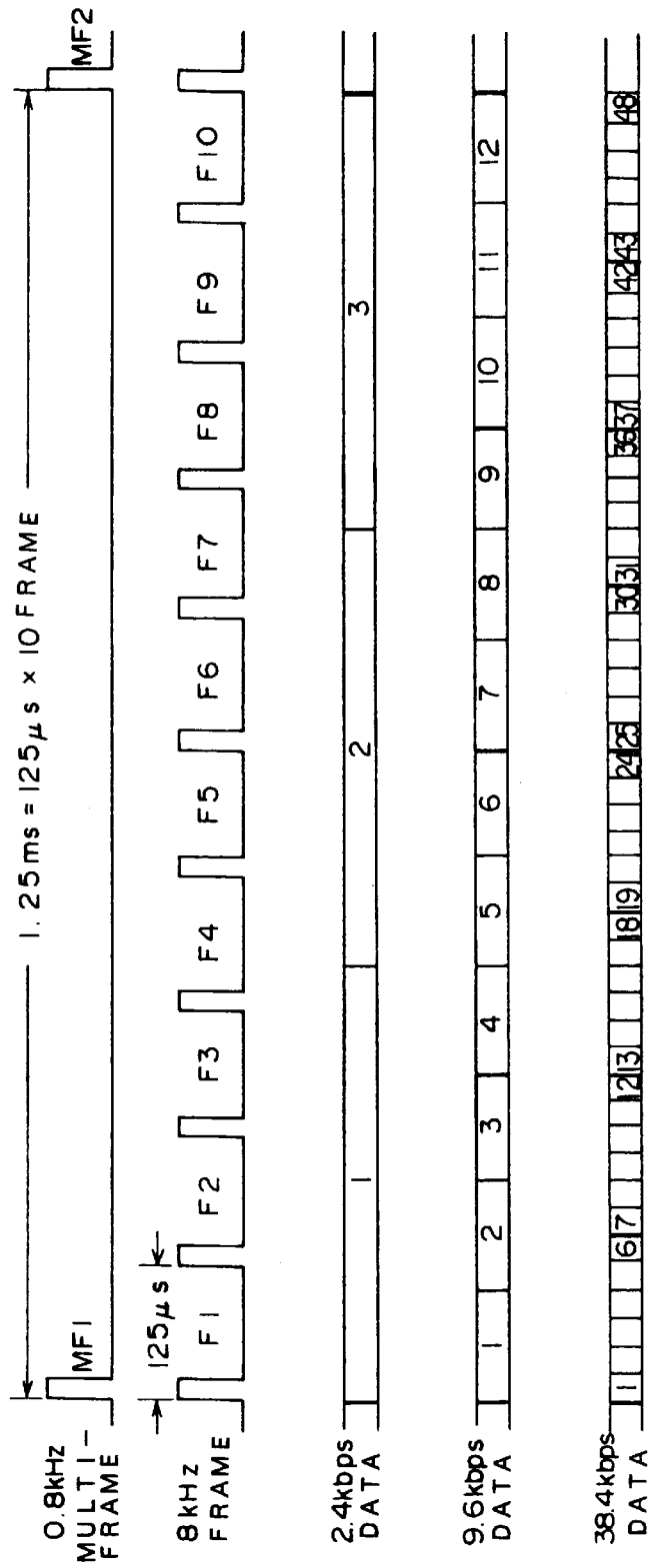
FIG. 7 is an explanation view showing a relation to the frame, the multi-frame and the data of 1.2 Kbps series.

FIG. 7 defined the 0.8 KHz period multi-frame in which the 10 frames of the 8 KHz period frame is equal to the one multi-frame. The 0.8 KHz period multi-frame is equal to one tenth of the 8 KHz period frame of the standard of the 64Kbps channel. The 0.8 KHz period multi-frame is convenient to treat the low-speed data. Therefore, one frame of the 0.8 KHz period multi-frame has a length of 1.25 ms. Here, although 10 frames of the 8 KHz frame is optionally the one multi-frame, it is possible to define the 0.4 KHz multi-frame in which the 20 frames of the 8 KHz frame is the one multi-frame.

FIG. 7 shows the relation with the signal data of the 0.8 KHz multi-frame and the 8 KHz frame, the 2.4 Kbps, 9.6 Kbps, 38.4 Kbps of data transmission speed of 1.2 Kbps series. FIG. 7 shows how many bits of data will be received during one frame of the 0.8 KHz multi-frame. As shown, 3 bits are received at 2.4 Kbps, 12 bits at 9.6 Kbps, and 48 bits at 4 Kbps.

Figure 8:
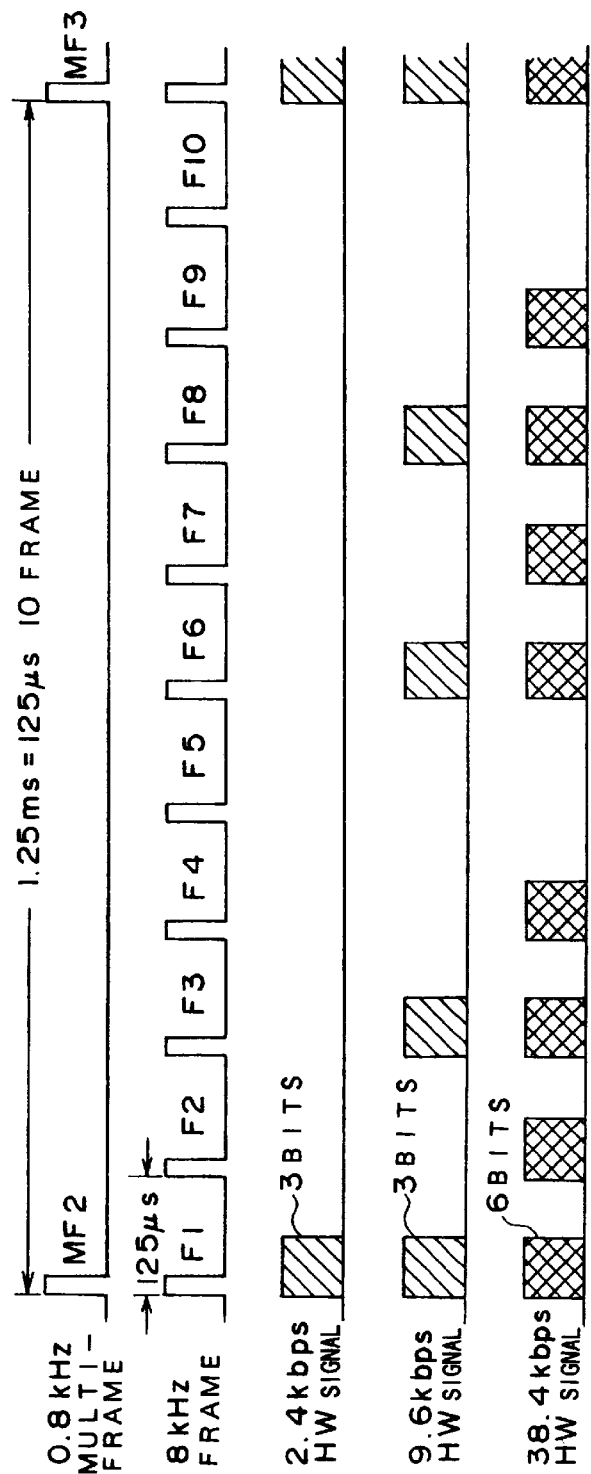
FIG. 8 is an explanation view showing the frame, the multi-frame and the 1.2 Kbps series data transmission using these frames and multi-frames.

According to the embodiment of the invention, it has been described that one 8 KHz frame carries 3 bits. If it is necessary to carry more than 3 bits, it defines that the 6 bits will be carried. FIG. 8 shows which 8 KHz frame in the 10 multi-frames will be good to send the data under such define. The time relation comparing to that of FIG. 7 is late one multi-frame or 1.25 ms.

As shown in FIG. 8, when it is 2.4 Kbps, only the first frame "F1" in the 10 multi-frames carries every 3 bits. When it is 9.6 Kbps, the first, the third, the sixth, the eighth frames or "F1, F3, F6, F8" in the 10 multi-frames carries every 3 bits.

In case of 38.4 Kbps, when even all 10 frames in the 10 multi-frames carries 3 bits, it is only 30 bits total carried and 30 bits*0.8 KHz=24 Kbps of the bit speed. Therefore, 6 bits are carried with one frame. As shown in FIG. 8, it is suitable to carry them with 8 frames other than the fifth and the tenth frames or "F5, F10".

In addition, when 1.2 Kbps is used, the identical data is sent twice, so it seems apparently that it is 2.4 Kbps. In this case, the sending time is late for two multi-frames or 2.5 ms.

Consequently, as shown in FIG. 8, the frame on which no data is carried and the other frame having data are generated in the 0.8 KHz multi-frames.

FIG. 9 shows an example of a time slot of the highway according to the embodiment of the invention. In the drawing, the marks "B7" through "B0" show the bits in any time slot. "B7" is the most significant bit (MSB) and "B0" is the least significant bit (LSB). As shown in FIG. 7 and FIG. 8, the marks "F1" through "F10" show the 10 frames in the 0.8 KHz multi-frame.

"B7" bit of MSB is used as a condition bit showing whether there is data in the frame or not. When there is data in the frame, ON (for example "0") is set. When there is no data in the frame, OFF (for example "1") is set. According to the embodiment, "B7" bit of this condition is called F-bit.

"B6" bit shown in FIG. 9 is used to carry the terminal control line signal and called S-bit. "S1" is used as a signal such as the sending requirement RS. "S2, S3 and etc." can be used for other purpose in necessary.

FIG. 9 shows a bit structure of each frame corresponding to FIG. 8.

It applied to when the low-speed data of 2.4 Kbps, 9.6 Kbps, 38.4 Kbps are transmitted to each time slot of the sending highway SHW. The marks "D1" through "D48" show the individual data of the 0.8 KHz multi-frame.

FIG. 10 shows a bit structure similar to that of FIG. 9 and relates to 8 Kbps, 56 Kbps, and 64Kbps of the data transmission speeds of 8 Kbps series. It is used to transmit using all 10 frames, so there is no F-bit.

Signal S-bit can be used when it is lower than 56 Kbps. When 64Kbps is applied, all bits are used as data bits, so S-bit cannot be used.

Transmission of data at a speed higher than 64Kbps can be done by using a plurality of 64Kbps channels.

FIG. 7 through FIG. 10 shows the primary figures including other data transmission speed. The figure shown in FIG. 11 is defined according to the particular embodiment of the invention.

Returning to FIG. 3, the RAC 2-14 reads out the data from the TSI (A) or (B) 2-13 with a format similar to that shown in FIG. 9 and FIG. 10 according to the data transmission speed of the DTE 10. When the F-bit is necessary, the RAC 2-14 instructs the F-bit adder 2-16 to add the F-bit to the data and transmits the added data to the time slot appointed of the sending high way SHW.

The data, which is carried on the time division 64Kbps channel of the sending highway SHW in the terminal I/F 2, is transmitted to a certain time slot of one receiving highway RHW in four BIT MPX/DMPX 5 (1) through (4) of the MUX 4 by means of the TSW 3.

The time division multiple equipment 20 intends to transmit the data effectively by bit-multiplexing the data of comparative low speed between two DTE 10 and using the high-speed digital line 30 of integral number times of intermediate 64Kbps. The equipment 20 does not have any exchanging function. However, it is possible at a certain degree to change a line set owing to ON-DEMAND by the introduction of the TSW 3 above.

The TSW 3 can change the line set between the terminal I/F 2 and the MUX 4 only within a set range of the MUX 4.

Figure 4:
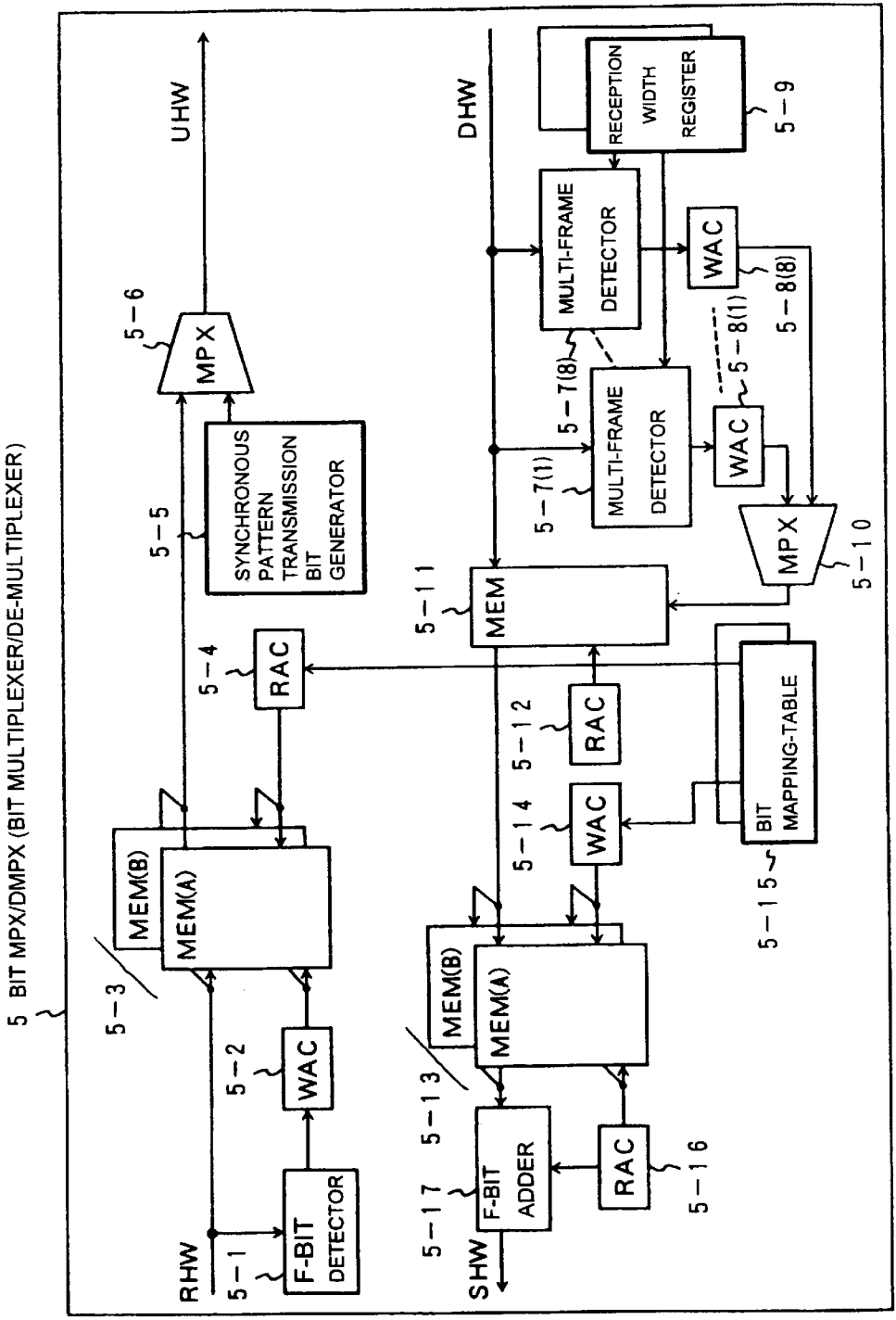
FIG. 4 is a block diagram showing a structure of the bit multiplexer/de-multiplexer shown in FIG. 2.

The sending highway SHW of the terminal I/F 2 has the 4 Mbps speed as mentioned above, so the data which is multiplexed to 64 channel time division at most and is carried with various speeds on the 64Kbps channel is entered in the receiving highway RHW in FIG. 4.

Next, outline of various equipments in the BIT MPX/DMPX 5 of FIG. 4 will be explained.

The sending highway SHW shown in FIG. 3 is connected to the receiving highway RHW in FIG. 4 through the TSW 3. The send and receive are in opposite relation.

As shown in FIG. 4, the BIT MPX/DMPX 5 has an F-bit detector 5-1, an F-bit adder 5-17, a memory MEM 5-3 for memorizing the upward data and a memory MEM 5-13 for memorizing the downward data. The BIT MPX/DMPX 5 has a write-in address controller WAC 5-2 for controlling the write-in of the MEM 5-3, a write-in address controller WAC 5-14 for controlling the write-in of the MEM 5-13, a read-out address controller RAC 5-4 for controlling the read-out of the MEM 5-3 and a read-out address controller RAC 5-16 for controlling the read-out of the MEM 5-13.

Further, this BIT MPX/DMPX 5 has a generator 5-5 for generating the transmission bit synchronous pattern and a multiplexer MPX 5-6 for multiplexing the synchronous pattern on the signal data.

This BIT MPX/DMPX 5 has a multi-frame detector 5-7 installed every route in order to detect the multi-frame of the downward signal data, a transmission width register 5-9 for indicating a reception width of the signal data at every route. The BIT MPX/DMPX 5 has a memory MEM 5-11, a write-in address controller WAC 5-8 for writing the downward data in the MEM 5-11 according to the information from the corresponding multi-frame detector 5-7. This corresponding multi-frame detector is installed at every route.

The BIT MPX/DMPX 5 has a multiplexer MPX 5-10 for multiplexing the write-in signal of the WAC 5-8 controlling the MEM 5-11, and a read-out address controller RAC 5-12 for controlling the read-out of the data memorized in the MEM 5-11, and a bit mapping-table 5-15 of a key of the bit multiplexing process, which will be explained in detail.

Next, an operation of the sending side bit multiplexer will be explained with reference to FIG. 4 and its principle will be explained with reference to FIG. 12 and FIG. 13.

Figure 12:
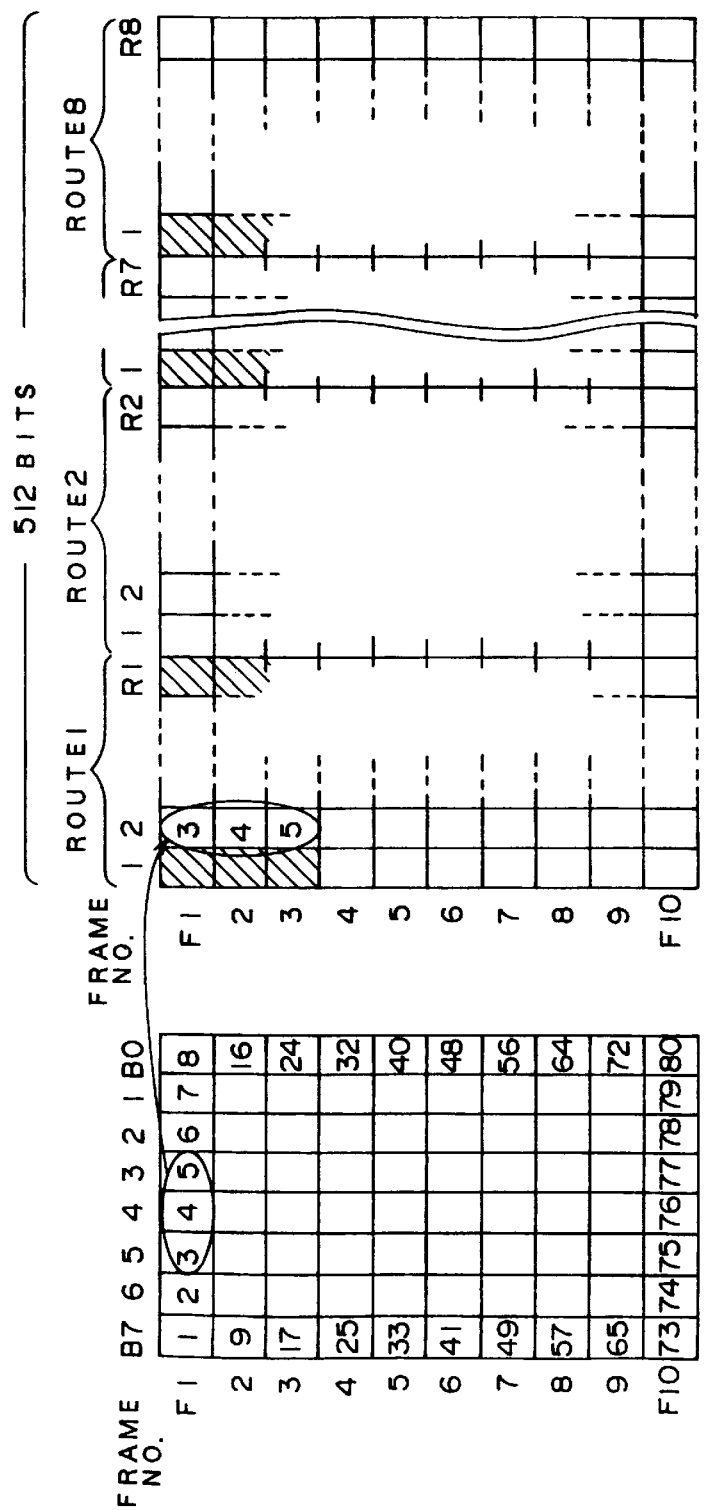
FIG. 12 is an explanation view of the bit multiplexing process using multi-frames.

The left view of FIG. 12 corresponds to a bit pattern shown in FIG. 9 and FIG. 10, showing all bits in one 0.8 KHz multi-frame in a certain time slot.

The MEM (A) and (B) 5-3 shown in FIG. 4 have memory area at every time slot for memorizing the bit pattern shown in the left view of FIG. 12. In these memory areas, the BIT MPX/DMPX 5 decides which the data in the particular bit speed should be memorized according to the data written in the bit mapping-table 5-15 mentioned later. In other words, the receiving bit pattern shown in FIG. 9 and FIG. 10 has been decided. Consequently, the F-bit detector 5-1 detects the F-bit every time slot in the highway signal of 4 Mbps entered into the receiving highway RHW shown in FIG. 4. The WAC 5-2 writes only meaningful data identified by the F-bit in the predetermined memory area.

As described above with reference to the time slot exchanger TSI (A), (B) 2-13 in FIG. 3, (A) and (B) of the MEM 5-3 are identical to each other. The writing-in process and the reading-out process are exchanged every 1.25 ms or 0.8 KHz period or every time necessary to write data in the memory area. When one of them are writing-in, the other of (A) and (B) are reading-out.

Next, the method of the bit-multiplexing process will be explained with reference to FIG. 12.

As shown in FIG. 9 and FIG. 10, in case of the low-speed data, the data capacity to be written in the memory area in the left view of FIG. 12 is small. Therefore, if this low-speed data is input into the transmission route, this will generate much inefficiency data resulting in a poor efficiency. Then, in order to convert the data shown in the left view of FIG. 12 into the transmission format, a virtual table in the right view of FIG. 12 is made resulting in the transformation of the data. This table will be called the virtual table hereinafter.

The size of the virtual table must have a memory area shown in the left view of FIG. 12 or the number of bits for the 64 time slot, in order to make the virtual table be applied to any transmission speed. Theoretically, the lateral and the longitudinal lengths of the virtual table are able to be determined freely. Only restrictive condition is that the number obtained by multiplexing the longitudinal length and the number of bits on the lateral length is equal at least to the number obtained by multiplying the number of bits on the left table and the number of the time slot.

The virtual table is used to map only the meaningful data of the memory area shown in the left view of FIG. 12, so it is not necessary to have all 64 time slot of the left memory area. It is possible to make the virtual table small and to compress the data capacity.

According to the embodiment, the virtual table does not compress the data capacity and the SUBRATE MPX/DMPX 6 decreases the speed to a half. The same effect can be obtained also by making the virtual table a half, or making 512 bits along a lateral direction in the right view of FIG. 12 a half (256 bits).

Simplifying here, the number of bits obtained by multiplying the memory area in the left view of FIG. 12 (10 frames*8 bits) and 64 time slots, is mapped on the virtual table having a width 10 identical with the number of frames of one multi-frame, each having 512 bits. This corresponds to 512 bits of "F1" through "F10" along a longitudinal direction in the right view of FIG. 12.

Furthermore, 512 bits along the lateral direction is divided at every route of the transmission route. Division is done according to the data capacity of each route. Here, the number of routes is presumed to 8. In FIG. 12, "R1" bit through "R8" bits are allotted to every route. The total from "R1" to "R8" is 512.

The meaningful data written in the memory area shown in the left view of FIG. 12 is 3 bits in the case of using the 2.4 Kbps signal. The data bits "3,4,5" are respectively written on "B5, B4, and B3" of "F1" on the memory area in the left view of FIG. 12. Therefore, presuming that a target is route 1, it is allotted on the second bit of "F1, F2, and F3" of the route 1 on, for example, the table in the right view of FIG. 12.

As described above, the meaningful data of other time slots is allotted from, for example, the left-end vacant space of the table in the right view of FIG. 12. As a result, any bit other than the meaningful data on the memory area in the left view of FIG. 12 is not mapped on the table in the right view.

Carrying out such operation on all time slots, only the meaningful data at every route are allotted from the left end of the table in the right view. When the right table having the meaningful data allotted is read-out, for example, from left position to right position, from upper position to lower position, the meaningful data is systematically arranged at every route. Consequently, it is easy to pick up only the meaningful data at every route and transmit the pick-up data along the transmission route.

In addition, it is impossible to carry the data on "F1, F2, F3" (hatching portions) of the bit number "1" of each route shown in the table in the right view of FIG. 12 because the synchronous signals are carried thereon as described later.

Actual operation of the write-in and read-out process on the virtual table will be explained with reference to FIG. 13.

Figure 13:
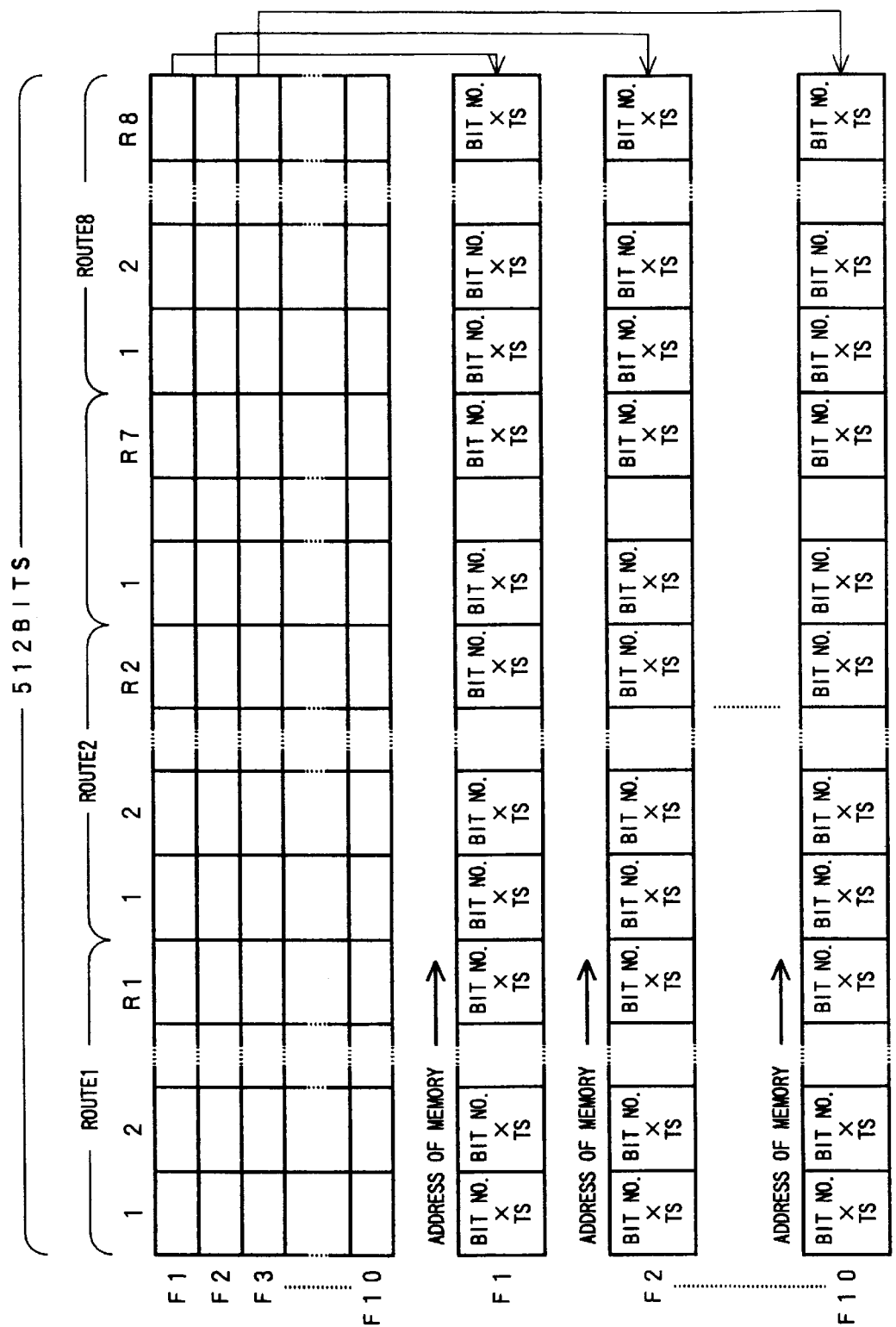
FIG. 13 is an explanation view of the bit mapping-table on the memory.

Transferring the right table of FIG. 12 thereto creates the table of FIG. 13. This table shows all bits to be transmitted by one 0.8 KHz multi-frame in the 4 Mbps highway. These "F1" through "F10" tables shown on the lower portion of FIG. 13 are contents of the bit mapping-table 5-15 in FIG. 4 and small frames in FIG. 13 corresponds to one bit of the virtual table above.

In these small frames, the former bit number (one of bit numbers "1" through "80" on the left memory area of FIG. 12) and the time slot number TS are written. The former bit number is mapped on the virtual table corresponding to the frame. In other words, the time slot number TS is an address of the input data bit written in the memory MEM 5-3 (A), (B) of FIG. 4.

As a result, the RAC 5-4 shown in FIG. 4 reads out sequentially the address of "F1" from left to right on the bit mapping-table shown in the lower portion of FIG. 13. This bit mapping-table corresponds to the bit mapping-table 5-15 shown in FIG. 4. The RAC 5-4 reads out the data in the address on the memory MEM (A), (B) 5-3. Such operation is repeated from "F2" to "F10", and resultantly data on the right virtual table of FIG. 12 are read out from left to right, and from the upward to the downward.

Such operation of picking up only the meaningful data from the low-speed data carried on the 64Kbps channel and compressing the picked-up data is called the bit multiplexing process.

The data read-out from the memory MEM (A), (B) 5-3 is transmitted to the MPX 5-6 in FIG. 4 at the 4 Mbps speed.

As apparent from the explanation above, the data speed of each route is decided by the bit mapping-table 5-15 in FIG. 4. Consequently, a changing of the written data of the bit mapping-table 5-15 sets freely a network structure in a range of the number of routes of the time division multiple equipment 20.

There is a request for changing the line structure from one for day to another for night. Therefore, the bit mapping-table 5-15 has two table faces. That is to say, one face corresponds to the daytime etc., the other face to the nighttime etc. The spare face of the table faces is previously changed in its written content and it is changed to the spare face at the change time, so the line structure can changes instantly.

The MPX 5-6 in FIG. 4 adds the synchronous signal with the opposite equipment to the data. This synchronous signal has two patterns for the catching-synchronization and the holding-synchronization shown in FIG. 14. According to the embodiment, the initial synchronous establishment pattern of the catching-synchronization shown in FIG. 14 (1) is constructed with 7 bits and is exchanged with the opposite equipment before a start of communication. To the synchronous establishment pattern, 1 bit of an answer bit shown by "A" in FIG. 14(1) is further added. This is done to make the opposite equipment inform whether the synchronization has been established or not. When no synchronous establishment is occurred, "0(zero)" is transmitted. When the initial synchronous establishment pattern of 7 bits continuously is detected, for example, eight times, it is presumed that the synchronization is established obtaining "A=1" and sending the synchronous establishment signal to the opposite or target equipment. When "A" of the initial synchronous establishment pattern sent from the target equipment becomes "1" also, it is said that the synchronous establishment is mutually recognized, then the synchronous signal is changed to the shrink synchronous pattern of 3 bits for the holding-synchronization shown in FIG. 14 (2) according to the embodiment. When the initial synchronous establishment pattern is long, the number of continuous detection necessary to recognize the synchronous establishment becomes small. On the contrary, when the initial synchronous establishment pattern is short, the number of the continuous detection necessary to recognize the establishment increases. In other words, the long pattern makes the time necessary to obtain the synchronous establishment short and the short pattern makes the time long. According to the embodiment of the invention, 7 bits are used to the initial synchronous establishment pattern and the number of detecting continuously the initial synchronous pattern is 8 times. It is sufficient to keep a synchronous condition after it is established, so it is exchanged to the shrink synchronous pattern of 3 bits in order to make the data to be transmitted by a part of the synchronous signal area.

Time for establishing the initial synchronization is differed from each other according to the route, and the 3 bits shrink synchronous pattern is sent at a front of the 0.8 KHz multi-frame every route as shown by hatching portion in FIG. 12. The synchronous pattern mentioned above is generated by the transmission bit synchronous pattern generator 5-5 shown in FIG. 4, the MPX 5-6 multiplexes the pattern with the transmission data and transmits the multiplexed data to the upward highway UHW.

Figure 15:
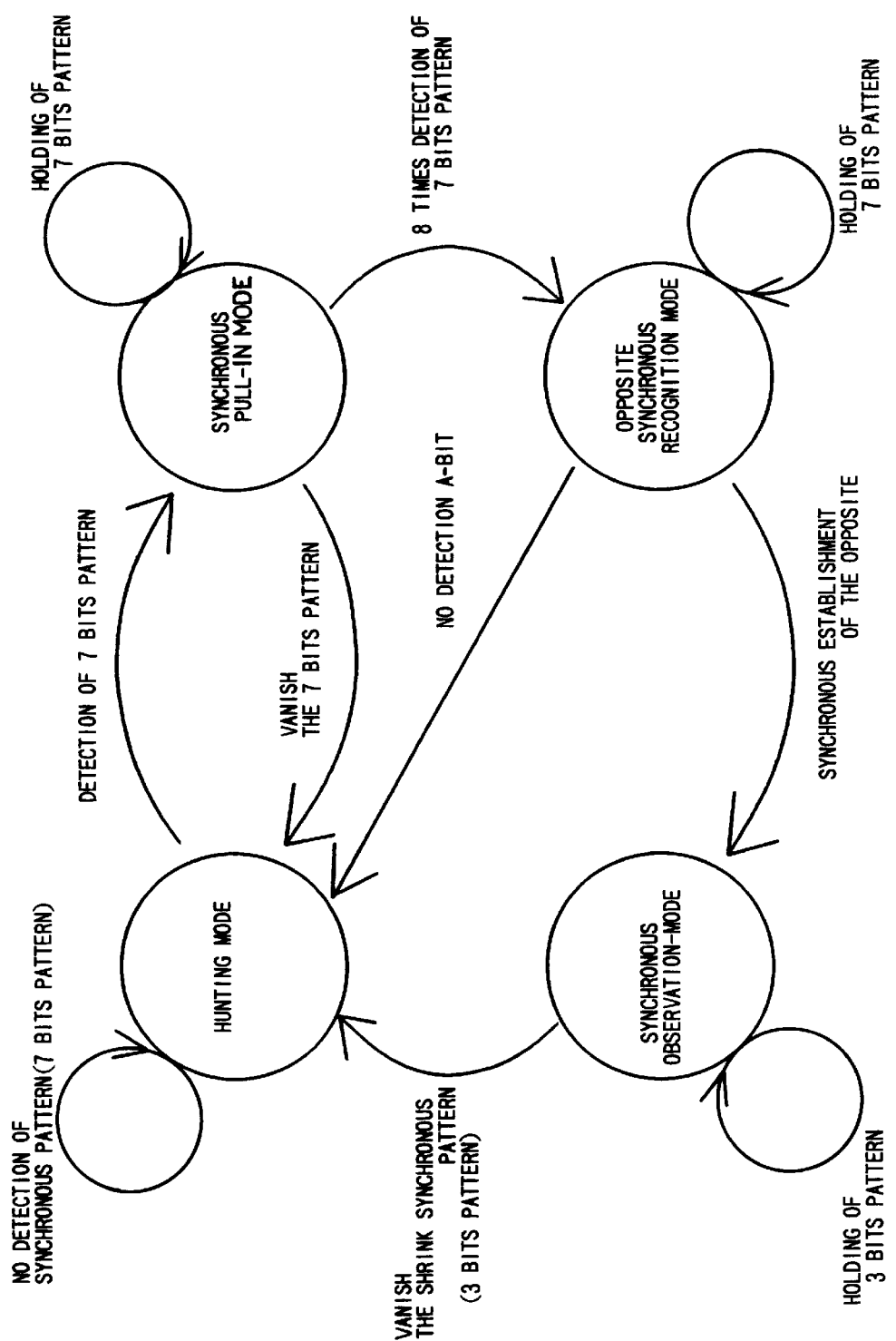
FIG. 15 is a condition conversion view between respective modes of the synchronous establishment condition and the synchronous hold condition.

FIG. 15 shows a condition conversion view of the establishment and the hold mentioned above of the synchronous condition, and they convert amount a hunting mode, a synchronous pull-in mode, an opposite synchronous recognition mode, a synchronous observation mode. The hunting mode is a condition in which no synchronous pattern is detected and the 7 bits synchronous pattern is being hunted.

When the 7 bits synchronous pattern is detected in a multi-frame, the hunting mode is entered into the synchronous pull-in mode and this mode is held until the pattern is continuously detected of the predetermined number, for example, 8 times. If a condition in which the synchronous pattern is not detected continuously by the predetermined number continues, the synchronous pull-in mode returns to the hunting mode again.

When the 7 bits synchronous pattern has been continuously detected on the predetermined times, for example, 8 times, the A-bit is sent in order to inform the opposite equipment of the establishment of the initial synchronous condition. The equipment of the establishment of the initial synchronization and receiving the A-bit concludes that the opposite side has completed of the synchronous establishment, and transfers it to the synchronous observation mode. This synchronous observation mode is kept during the communication. When the synchronous condition does not continue with any reason during the synchronous observation mode, it returns to the hunting mode.

This synchronous signal is necessary to the bit-multiplexing operation. However, when there are a plurality of the bit-multiplexing area (route), the synchronous sequence of each area (route) operates independently as shown in FIG. 15.

The mark "Rk" in FIG. 14 shows the bit number at every route in FIG. 12.

Figure 5:
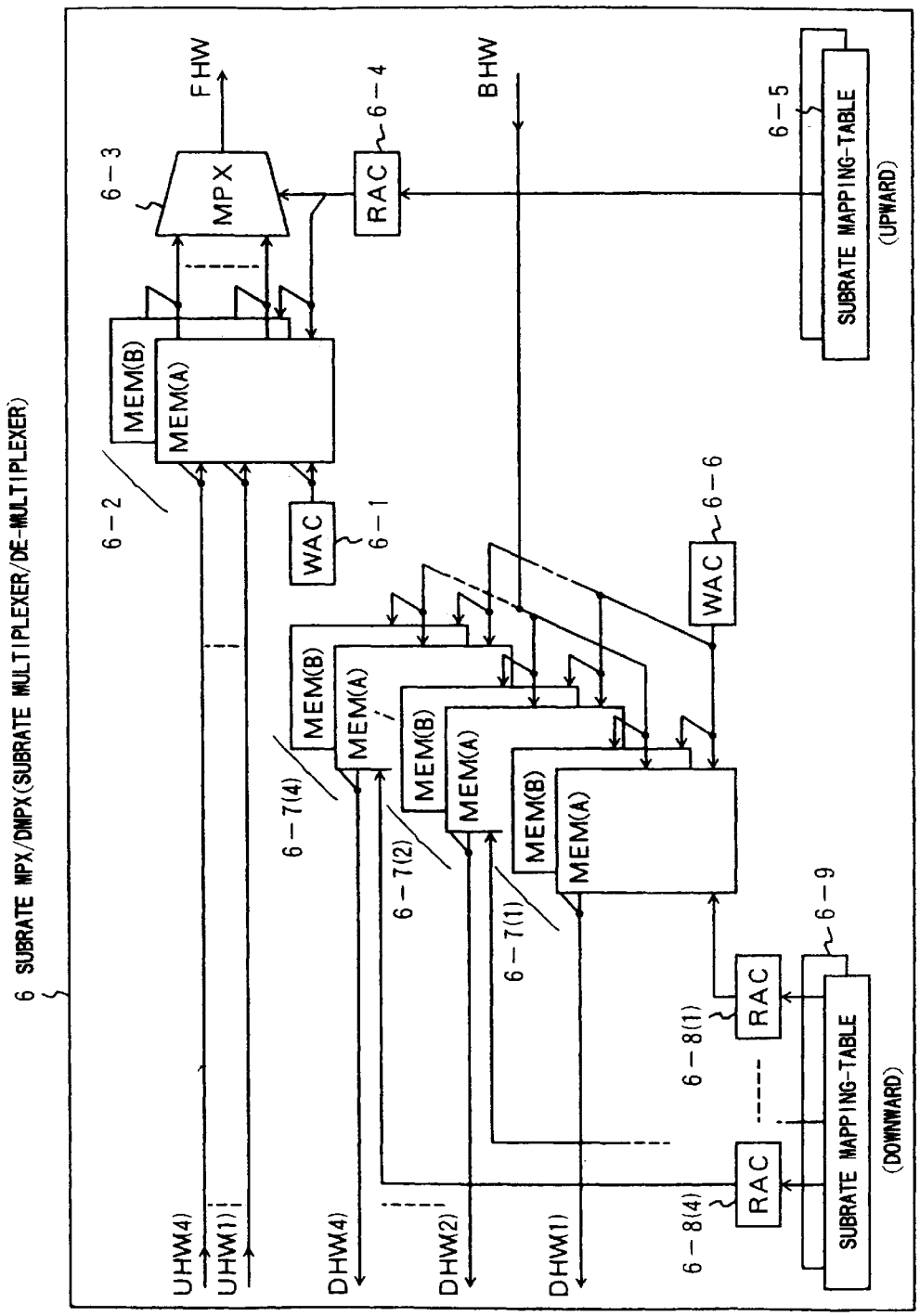
FIG. 5 is a block diagram showing a structure of the sub-rate multiplexer/de-multiplexer shown in FIG. 2.

As shown in FIG. 5, the SUBRATE MPX/DMPX 6 has an upward-data memory MEM 6-2 for memorizing the upward data and a downward-data memory MEM 6-7(1)–(4) for memorizing the downward data. According to the embodiment, the downward-data memory MEM 6-7 has 4 memories (1)–(4) corresponding to the same number as that of the BIT MPX/DMPX 5.

As shown in FIG. 5, the SUBRATE MPX/DMPX 6 has a write-in address controller WAC 6-1 for controlling the write-in of the data from the upward highway UHW (1)–(4) in the memory MEM 6 2, and a read-out address controller RAC 6-4 for controlling the read-out only the necessary data in the memory MEM 6-2 according to contents of the upward sub-rate mapping table 6-5 and instructing the MPX 6-3. The MPX 6-3 transmits the multiplexed data to the forward highway FHW.

The SUBRATE MPX/DMPX 6 has a write-in address controller WAC 6-6 for controlling the write-in of the data from the backward highway BHW in all memories MEM 6-7, and a read-out address controller RAC 6-8(1)–(4) for controlling the read-out of the data from the backward highway BHW in all memories MEM 6-7. These RAC 6-8(1)–(4) are installed so as to correspond with the downward memory MEM 6-7 (1)–(4). The RAC 6-8(1)–(4) reads out only the data corresponding to each downward highway DHW in accordance with the contents of the downward sub-rate mapping-table 6-9.

Next, an operation of the SUBRATE MPX/DMPX 6 will be explained with reference to FIG. 5.

The upward highway UHW in FIG. 4 is connected to anyone of these upward highways of the SUBRATE MPX/DMPX 6 shown in FIG. 5.

As described above, the figure in the bracket shows the circuit number and it is apparent that the MUX 4 according to the embodiment has four upward highways UHW and four downward highways DHW, or four BIT MPX/DMPX 5.

Into the upward memory MEM (A), (B) 6-2, four upward highways UHW of 4 Mbps enters. These input data are sequentially written in the upward memory MEM (A), (B) 6-2 according to the control operation of the WAC 6-1.

As described above, the data written in the upward memory MEM (A), (B) 6-2 is obtained by reading out the right virtual table shown in FIG. 12 from left to right, and from the upward to the downward. These data written in four upward highway UHW (1) to (4) are read out according to the contents of the upward sub-rate mapping-table 6-5 shown in the left view of FIG. 16.

When the data speed of the DTE 10 and the like connected to the terminal I/F 2 is low, few meaningful data is sent comparing to the bit rate of the upward highways UHW (1) to (4).

Supposing that all DTE 10 are synchronous terminals of 64Kbps, all highways of 4 Mbps have data carried thereon, so it is said that these highways are used completely. Considering such extreme situation mentioned above, the read-out speed of the upward memory MEM (A), (B) 6-2 must be equal to 4 Mbps identical with its write-in speed and the output side of the MPX 6-3 must be 16 Mbps of four times.

However, there is no meaning in using the time division multiple equipment in such extreme situation. The purpose of using the time division multiple equipment 20 resides in the effective execution of the communication with the DTE 10 of relatively low-speed through the high speed digital line 30, wherein the high-speed digital line 30 having a unit of 64Kbps. Therefore, the SUBRATE MPX/DMPX 6 decreases the speed in order to improve the efficiency of the transmission route.

In many cases, the data speed of the DTE 10 is low comparing to the 64Kbps of the basic speed, so the speed of the forward highway FHW decreases until 8 Kbps or a half of 16 Kbps.

Figure 16:
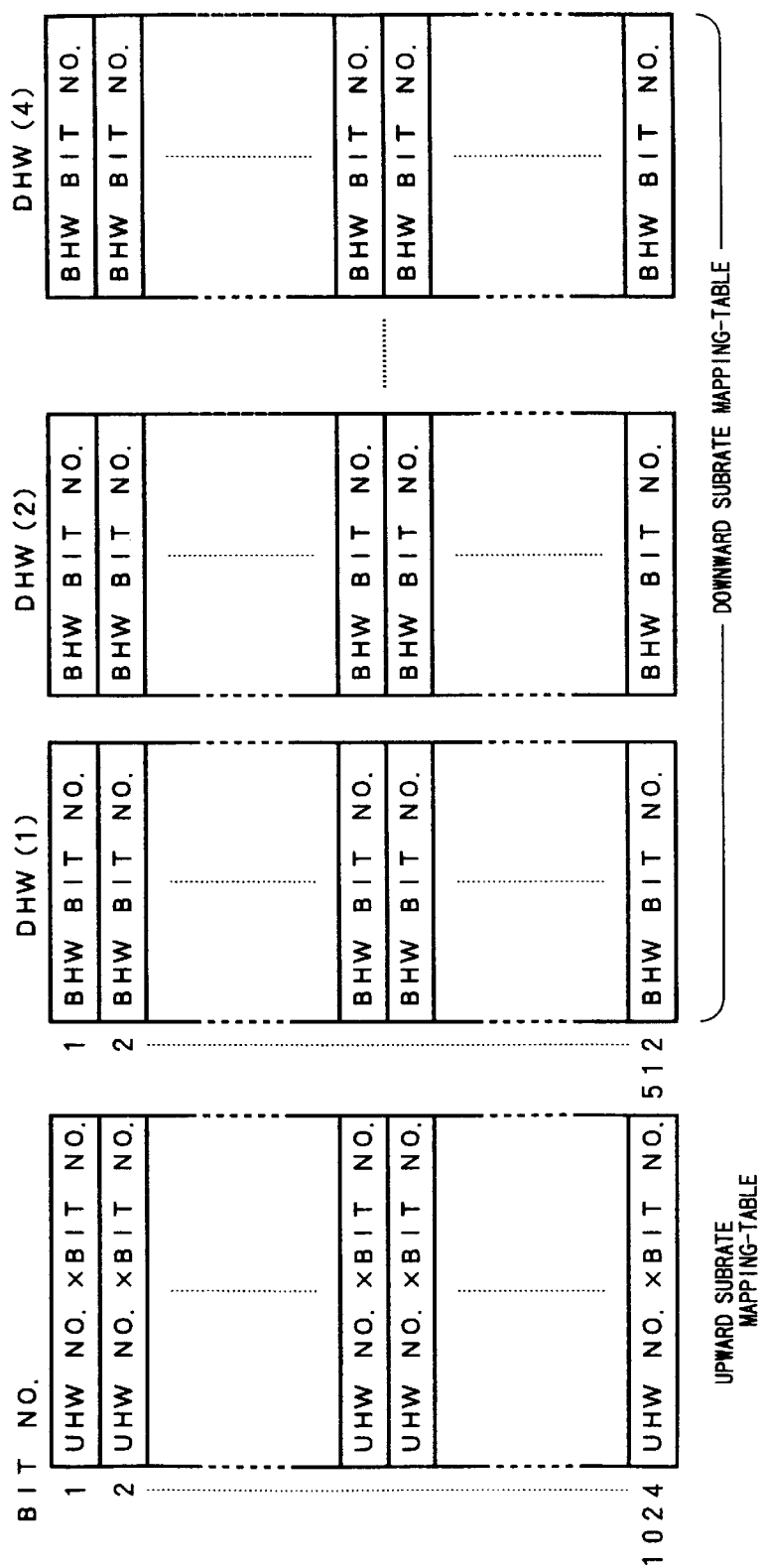
FIG. 16 is an explanation view of the up and the down sub-rate mapping-tables.

The table for one frame of the upward sub-rate mapping-table 6-5 is structured as shown in the left view of FIG. 16. That is, 1.024 bit is allotted on each frame and each frame has anyone of the upward highway UHW number (1) through (4) and the bit number in the upward highway UHW, which are written in per one bit.

Because each upward highway UHW has 512 bits per one frame, the number of the bit will be reduced to a half by the sub-rate mapping-table 6-5.

As described above, the data on the upward highway UHW are allotted on the sub-rate mapping-table 6-5 in the bit-by-bit manner, and the shrink synchronous pattern shown in FIG. 14 is arranged on the upward sub-rate mapping-table every route.

The RAC 6-4 reads out the data on the upward memory MEM (A), (B) 6-2 instructed by the sub-rate mapping-table 6-5 one bit by one bit, it is multiplexed through the MPX 6-3 and all multiplexed data is transmitted to the forward highway FHW at the 8 Kbps speed.

To the forward highway FHW of 8 Mbps data speed, the transmission route I/F 7 (1) through 7(j) are connected.

Figure 6:
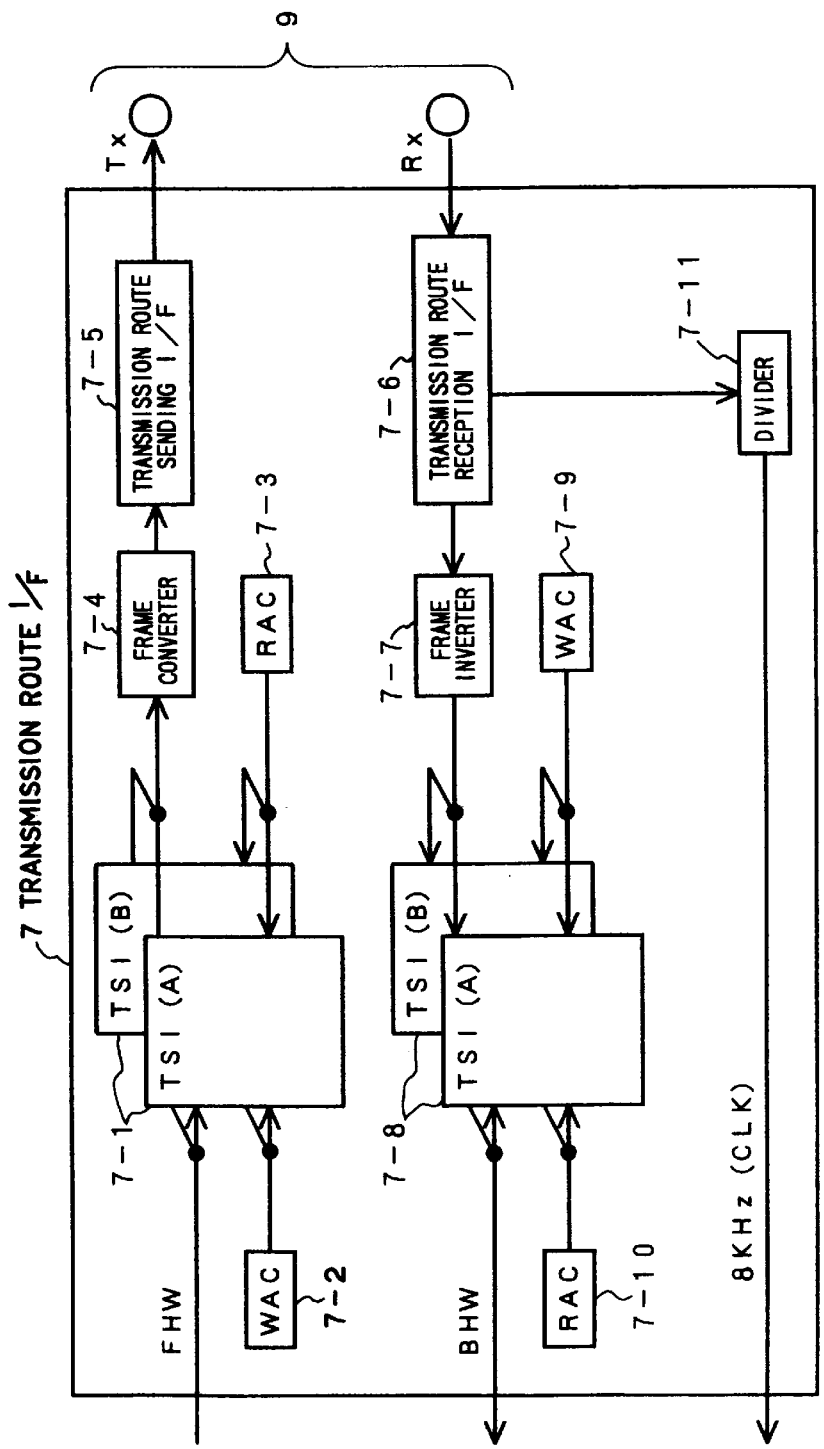
FIG. 6 is a block diagram showing a structure of the transmission route interface.

As shown in FIG. 6, the transmission route I/F 7 has an upward time slot exchanger TSI 7-1, a downward time slot exchanger TSI 7-8, a read-out address controller RAC 7-3 for controlling the read out of the TSI 7-1, a RAC 7-10 for controlling the read-out of the TSI 7-8, a write-in address controllers WAC 7 2 for controlling the write-in of the TSI 7-1 and a WAC 7-9 for controlling the writein of the TSI 7-8.

The transmission route I/F 7 has a frame converter 7-4 and a frame inverter 7-7, which match the speed in the transmission route I/F 7 with the transmission speed in the transmission route.

The transmission route I/F 7 has a transmission route sending I/F 7-5 and a transmission route reception I/F 7-6, which match the electric condition of the high-speed digital lines 30 for the reception and for the sending with each other. The transmission route I/F 7 has a frequency divider 7-11 for picking up the synchronous signal from the transmission route reception I/F 7-6 and dividing its synchronous signal, and making out the 8 KHz clock CLK.

A port 9 at a transmission route side consists of "Tx" at the sending side and "Rx" at the reception side.

As to transmission route I/F 7 shown in FIG. 6, the WAC 7-2 has the bit number information on the forward highway FHW to be taken by the WAC 7-2. The data is written in the TSI (A), (B) 7-1 with a unit of 8 bits.

The data read-out by the RAC 7-3 in a shape of data, which is easy to make a unit of 64Kbps, is converted in frame by the frame converter 7-4 so as to match with the speed of the transmission route. Therefore, the converted data speed being, for example, 64Kbps, 128 Kbps, or 384 Kbps. The frame converter 7-4 transmits the converted data to the transmission port "Tx" through the transmission route sending I/F 7-5.

Ports 9(1) through 9(j) shown in FIG. 2 respectively express the sending port "Tx" corresponding to the transmission route I/F 7 (1) through 7(j) and the reception port "Rx" described later.

The transmission route according to the embodiment is an exclusive line having I-interface between ISDN and user's terminal according to the standard advice of ITU-T, or ISDN line.

The input data from the transmission route will be explained just below. The signal entered to the reception port "Rx" of the port 9 shown in FIG. 2 enters the transmission route reception I/F 7-6. The divider 7-11 picks up the synchronous signal in the data received by the transmission route reception I/F 7-6, and divides the synchronous signal into the 8 KHz clock. The divider 7-11 of the transmission route I/F 7 transmits the 8 KHz clock to the system clock generator SCLK 8.

The frame inverter 7-7 takes only the signal data from the transmission route reception I/F 7-6 and the data are written sequentially in the TSI (A), (B) 7-8 by means of control operation of the WAC 7-9.

The RAC 7-10 reads out the data one bit by one bit in synchronization with the clock from the system clock generator SCLK 8 and carries them on a predetermined bit position of the backward highway BHW of 8 MHz.

A de-multiplexer DMPX of the SUBRATE MPX/DMPX 6 writes data entered into the backward highway BHW by the control operation of the WAC 6-6 in all memory MEM (A), (B) 6-7(1) through (4) having four circuits.

The RAC 6-8 (1) through (4), which respectively correspond to the memory MEM (A), (B) 6-7(1) through (4), reads out only the data corresponding to its own controller, with reference to the downward sub-rate mapping-table 6-9 corresponding to the RAC 6-8.

As shown in the right view of FIG. 16, the downward sub rate mapping-table 6-9 is installed every downward highway DHW and every frame. In the downward sub-rate mapping-table 6-9, the bit number of the backward highway BHW to be read-out is written. FIG. 16 shows only that for one frame.

The data transmitted to the downward highway DHW is entered into the downward highway DHW of the BIT MPX/DMPX 5 in FIG. 4 and its synchronous signal is detected by the multi-frame detectors 5-7(1) through (8) installed every route. Then, a bit position boarding the route or a width of the data bit every route is given to the multi-frame detectors 5-7(1) through (8) from the reception width register 5-9.

Consequently, the WAC 5-8 corresponding to the route receives information of the head position of data every route from the corresponding multi-frame detectors 5 7(1) through (8). The write-in signal output from the WAC 5-8 (1) through (8) is multiplexed so as to prevent from overlapping in time by the MPX 5-10. The data on the downward highway DHW are written in the memory MEM 5-11.

Figure 17:
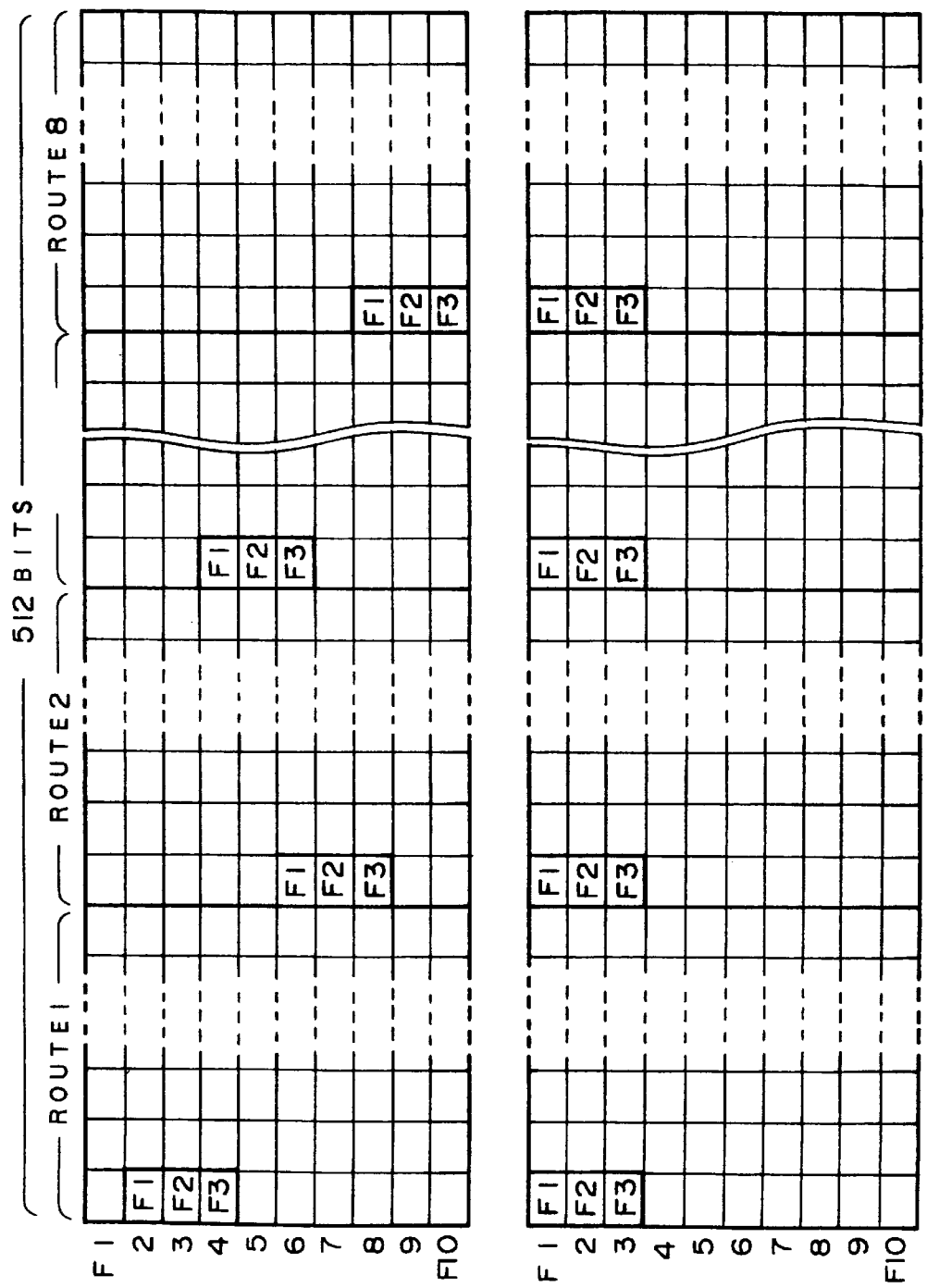
FIG. 17 is an explanation view of the data on the memory carrying out the bit de-multiplexing process.
Figure 18:
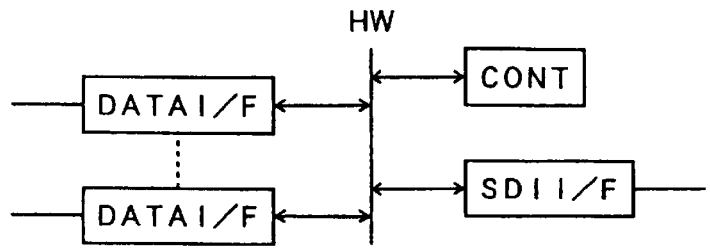
FIG. 18 is a block diagram showing one of conventional technology of the bus connection system.
Figure 19:
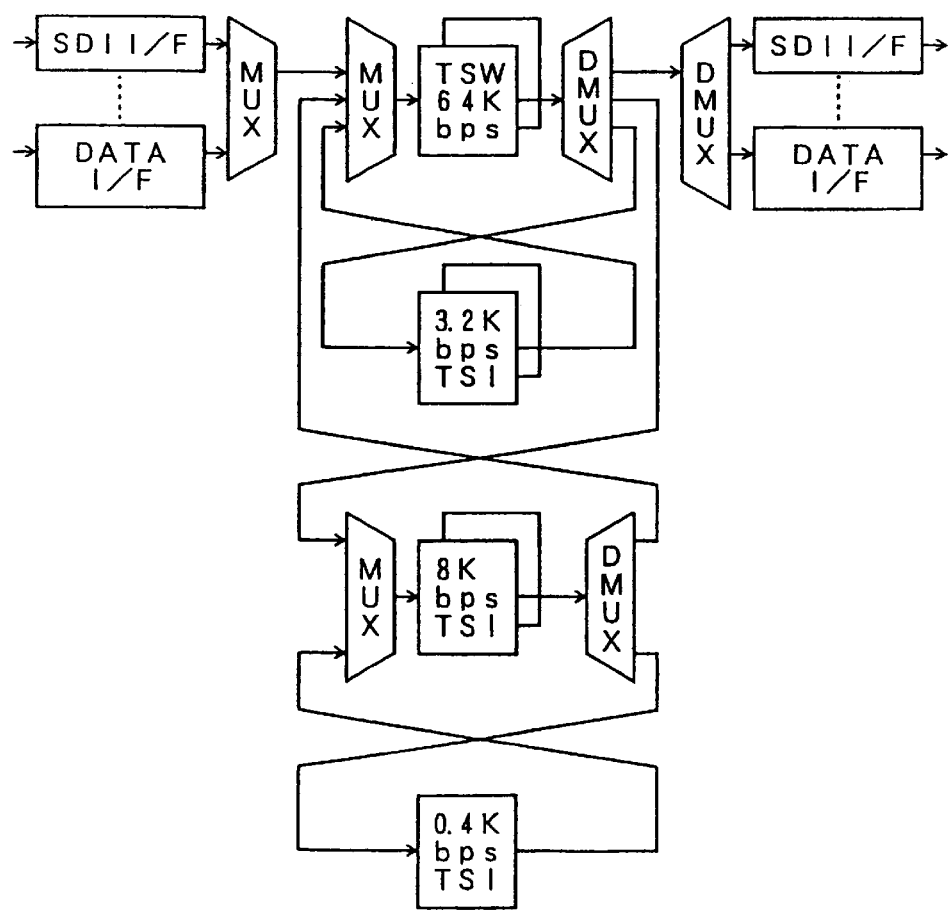
FIG. 19 is a block diagram showing one of the conventional technologies of time division switch system.

Into the memory MEM 5-11, the position of the synchronous signal for the bit-multiplexing process of each route as shown in the upper view of FIG. 17 is entered at a random shape. "F1, F2, F3" shows the synchronous signals of the shrink synchronous pattern of 3 bits pattern described above and they mean the head of data every route.

When the transmission signal was bit-multiplexed by the BIT MPX/DMPX 5, the synchronous bits were arranged on "F1, F2, F3" from the first bit of every route as shown in FIG. 12. Consequently, in order to carry out the bit de-multiplexing process or a bit reverse-multiplexing process, it is necessary to re-arrange the synchronous bits "F1, F2, F3" on the head position of each route as shown in the lower view of FIG. 17.

The RAC 5-12 reads out, sequentially from "F1", the contents of the memory MEM 5-11 arranged at random every route and transfers them to the memory MEM (A), (B) 5-13.

It is the same as that of the upper view of FIG. 13 is read from left to right, from up to bottom, so it becomes possible to use the bit mapping table 5-15 having lower table of FIG. 13 written-in and carry out the bit de-multiplexing process or the bit reverse-multiplexing process.

The memory MEM (A), (B) 5-13 has a time slot part or 64 sheets of 80 bit table of 8 bit*10 frames expressing the 0.8 KHz multi-frame shown in the left view of FIG. 12. The WAC 5-14 writes the data transferred from the memory MEM 5-11 in the position of the memory MEM (A), (B) 5-13 instructed by the bit mapping-table 5-15.

As a result, the memory MEM (A), (B) 5-13 obtains the bit pattern as shown in FIG. 9 and FIG. 10.

It is already explained that the bit mapping-table 5-15 has two faces which are not expressed with (A), (B) as the reception width register 5-9, the memory MEM 5-11, the sub-ratemapping-table 6-5 and 6-9. One of these faces is spare for instantly changing a set of the circuit structure. A detail of it is omitted.

The RAC 5-16 reads out the data memorized in the memory MEM (A), (B) 5-13, in order of the time slots and every frame, from bit "B7" to "B0" shown in the left view of FIG. 12. In case that it is data of the 1.2 Kbps series, the F-bit adder 5-17 adds "0(zero)" of the F-bit to "B7" bit showing that there is a meaningful data, then the F bit adder 5-17 transmits the added data to the sending highway SHW of 4 Mbps.

This sending highway SHW is connected to the receiving highway RHW, which is connected to the target terminal I/F 2 through the TSW 3.

When the F-bit detector 2-18 detects the F-bit in the time slot allotted by the F-bit detector 2-18 and in the data entered into the receiving highway RHW of the terminal I/F 2 shown in FIG. 3, the WAC 2-17 writes only the meaningful data in the TSI (A), (B) 2-19 with synchronizing the system clock.

The RAC 2-20 reads the data from the TSI (A), (B) 2-19 according to the transmission speed of the terminal and transmits them to the DMPX 2-21.

When the signal divided in the DMPX 2-21 is of the asynchronous terminal, the synchronous/asynchronous converter 2-23 converts the asynchronous signal into the synchronous signal. Also, when the signal divided in the DMPX 2-21 is of the synchronous terminal, the phases difference absorber 2-22 the phase difference of the signal. The selector SEL 2-24 selects one of the output signals from the synchronous/asynchronous converter 2-23 and the phases difference absorber 2-22. The selector SEL 2-24 transmits the selected signal to the data receiving port RD through the cable driver CD 2-1.

While, in case that the artificial carrier signal is used as a terminal control signal, the artificial carrier detector 2-26 detects the artificial carrier signal at before and after the main signal. The artificial carrier detector 2-26 transmits the artificial carrier signal to the selector SEL 2-25. Also, When the S-bit of the signal bit is used in a transmission of the control signal, the S-bit is picked up and sent to the selector SEL 2-25. The selector SEL 2-25 selects any appointed one and sends it to the carrier detection signal port CD through the cable driver CD 2-2.

The variable divider 2-6 receives the clock signals of 5.376 MHz and 8.064 MHz from the system clock SCLK 8 and divides them in order to make out the clock signal necessary to the DTE 10. The variable divider 2-6 transmits the clock signal to the clock port CLK through the cable driver CD 2-3.

Consequently, according to the embodiment, the bit-multiplexing of the signal bit in the data signal from a plurality of DTE 10 makes it possible to transmit plural low-speed digital data through the digital channel of basic speed. Therefore, it is possible to improve the efficiency of the high-speed digital line 30 connected among these plural time division multiple equipment 20.

According to the embodiment, the changing the connection of the TSW 3 makes it possible to change the structure of circuit on demand principle.

According to the embodiment, it is possible to remove the non-effective bits at the same time as the bit-multiplexing operation and compress its band.

According to the embodiment, the exchanging of the mapping table makes it possible to change instantly the circuit structure.

What is claimed is:

1. A time division multiple equipment, comprising:
   a plurality of terminal interfaces, wherein each terminal interface carries low-speed data from a data terminal equipment on a multi-frame having a period of one per an integral number in a frame period of a digital channel of a previously set basic speed;
   a multiple portion for multiplexing a signal bit with a bit unit by picking up only the signal bit of a data signal from the data terminal equipment in the plurality of multi-frames on which the data signal from the plurality of data terminal equipment are carried, and by mapping the signal bit in accordance with a content written in a mapping table; and
   a transmission route interface for matching a series of bits, multiplexed by the multiple portion, with a transmission speed of a high-speed digital line and for transmitting the series of bits to the high-speed digital line.

2. The time division multiple equipment according to claim 1, wherein the number of bits of a virtual table mapped by the mapping table for multiplexing the signal bit is equal to a figure obtained by multiplying a bit capacity per one time slot in one multi-frame by the number of the time slot.

3. The time division multiple equipment according to claim 1, wherein the number of bits of a virtual table mapped by the mapping table for multiplexing the signal bit is less than a figure obtained by multiplying a bit capacity per one time slot in one multi-frame by the number of the time slot.

4. The time division multiple equipment according to claim 1, wherein one length of a virtual table mapped by the mapping table for multiplexing the signal bit is equal to the number of frames in one multi-frame.

5. The time division multiple equipment according to claim 1, wherein the mapping table comprises:
   a plurality of sub-mapping tables for mapping the signal bit of the data signal from the data terminal equipment to the transmission route,
   wherein the content of each of the sub-mapping tables can be flexibly changed according to the changing of the line structure and the exchanging of the sub-mapping tables makes it possible to change the line structure according to the content of the exchanged sub-mapping tables.

6. The time division multiple equipment according to claim 1, wherein an input signal entering at random time from the plurality of the transmission route is initially stored for every route in a memory while the position of the bit multiplexing synchronous signal for every route is at random condition,
   wherein the input signal is read out of the memory so as to make the synchronous signals of each route equal in phase to each other, and
   wherein a bit reverse-multiplexing process is carried out.

7. A time division multiple equipment, comprising:
   a plurality of terminal interfaces, wherein each terminal interface carries low-speed data from a data terminal equipment on a multi-frame having a period of one per an integral number in a frame period of a digital channel of a previously set basic speed;
   a time division switch for executing a time division exchange process at the basic speed;
   a multiple portion for multiplexing a signal bit with a bit unit by picking up only the signal bit of a data signal from the data terminal equipment in the plurality of multi-frames on which the data signal from the plurality of data terminal equipment are carried, and by mapping the signal bit in accordance with a content written in a mapping table; and
   a transmission route interface for matching a series of bits, multiplexed by the multiple portion, with a transmission speed of a high-speed digital line and for transmitting the series of bits to the high-speed digital line,
   wherein the time division switch is provided between the terminal interface and the multiple portion.

8. The time division multiple equipment according to claim 7, wherein the number of bits of a virtual table mapped by the mapping table for multiplexing the signal bit is equal to a figure obtained by multiplying a bit capacity per one time slot in one multi-frame by the number of the time slot.

9. The time division multiple equipment according to claim 7, wherein the number of bits of a virtual table mapped by the mapping table for multiplexing the signal bit is less than a figure obtained by multiplying a bit capacity per one time slot in one multi-frame by the number of the time slot.

10. The time division multiple equipment according to claim 7, wherein one length of a virtual table mapped by the mapping table for multiplexing the signal bit is equal to the number of frames in one multi-frame.

11. The time division multiple equipment according to claim 7, wherein the mapping table comprises:
    a plurality of sub-mapping tables for mapping the signal bit of the data signal from the data terminal equipment to the transmission route,
    wherein the content of each of the sub-mapping tables can be flexibly changed according to the changing of the line structure and the exchanging of the sub-mapping tables makes it possible to change the line structure according to the content of the exchanged sub-mapping tables.

12. The time division multiple equipment according to claim 7, wherein an input signal entering at random time from the plurality of the transmission route is initially stored for every route in a memory while the position of the bit multiplexing synchronous signal for every route is at random condition,
    wherein the input signal is read out of the memory so as to make the synchronous signals of each route equal in phase to each other, and
    wherein a bit reverse-multiplexing process is carried out.

* * * * *